(12) United States Patent
Hamada et al.

(10) Patent No.: US 9,130,210 B2
(45) Date of Patent: Sep. 8, 2015

(54) BATTERY PACK

(71) Applicant: NISSAN MOTOR CO., LTD., Yokohama-shi, Kanagawa-ku (JP)

(72) Inventors: Karuki Hamada, Yokohama (JP); Tadashi Shoji, Yokohama (JP); Yukari Tadokoro, Sagamihara (JP); Taichi Oyama, Tokyo (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 134 days.

(21) Appl. No.: 14/077,975

(22) Filed: Nov. 12, 2013

(65) Prior Publication Data

US 2014/0065458 A1  Mar. 6, 2014

Related U.S. Application Data

(62) Division of application No. 10/202,011, filed as application No. PCT/JP2010/057216 on Apr. 23, 2010, now Pat. No. 8,592,068.

(30) Foreign Application Priority Data

Apr. 24, 2009 (JP) ................................ 2009-106856
Apr. 24, 2009 (JP) ................................ 2009-106895

(51) Int. Cl.
*H01M 2/10* (2006.01)
*H01M 2/02* (2006.01)
*H01M 6/42* (2006.01)

(52) U.S. Cl.
CPC .............. *H01M 2/1077* (2013.01); *H01M 6/42* (2013.01)

(58) Field of Classification Search
None
See application file for complete search history.

(56) References Cited

U.S. PATENT DOCUMENTS

| | | | |
|---|---|---|---|
| 3,623,917 A | 11/1971 | Chassoux | |
| 4,065,603 A | 12/1977 | Coibion | |
| 4,113,926 A | 9/1978 | McBrien | |
| 5,747,186 A | 5/1998 | Morishita et al. | |
| 5,766,801 A | 6/1998 | Inoue et al. | |
| 6,197,446 B1 | 3/2001 | Fukuda et al. | |

(Continued)

FOREIGN PATENT DOCUMENTS

| | | |
|---|---|---|
| JP | 08-264170 A | 10/1996 |
| JP | 09-120808 A | 5/1997 |
| JP | 2001-345082 A | 12/2001 |

(Continued)

OTHER PUBLICATIONS

Supplementary European Search Report dated Feb. 26, 2014 (6 pgs.).

(Continued)

*Primary Examiner* — Cynthia K Walls
(74) *Attorney, Agent, or Firm* — Foley & Lardner LLP

(57) ABSTRACT

A battery pack (1) includes: paired supporting members (35); a battery module (3, 5, 7) disposed between the supporting members (35); and a stack member (43) supporting the battery module (3, 5, 7) by linking the supporting members to each other. An extending portion (43a) protruding from the battery module (3, 5, 7) is formed by extending an end portion of the stack member (43). Accessories (12) are attached to a side surface on a side where the extending portion (43a) of the stack member (43) is disposed, the side surface being one of side surfaces of the battery pack which are provided with the paired supporting members (35).

4 Claims, 21 Drawing Sheets

(56) References Cited

U.S. PATENT DOCUMENTS

| | | |
|---|---|---|
| 7,479,758 B2 | 1/2009 | Moon |
| 2007/0141459 A1 | 6/2007 | Goto et al. |

FOREIGN PATENT DOCUMENTS

| | | |
|---|---|---|
| JP | 2004-311290 A | 11/2004 |
| JP | 2006-120489 A | 5/2006 |
| JP | 2007-165164 A | 6/2007 |
| JP | 2008-186725 A | 8/2008 |
| RU | 76169 U1 | 9/2008 |
| RU | 2 338 302 C1 | 11/2008 |
| SU | 1762343 A1 | 9/1992 |

OTHER PUBLICATIONS

Japanese Office Action and English Language Translation dated Jul. 9, 2013 (3 pages).

BATTERY PACK

CROSS-REFERENCE TO RELATED PATENT APPLICATIONS

This application is a divisional application of U.S. application Ser. No. 13/265,453 filed Oct. 20, 2011, which is the National Stage Application of International Application No. PCT/JP2010/057216, filed Apr. 23, 2010, which claims priority to Japanese Patent Application Nos. 2009-106856 and 2009-106895 filed Apr. 24, 2009, the entire contents of all are incorporated herein by reference.

TECHNICAL FIELD

The present invention relates to a battery pack.

BACKGROUND ART

Patent Literature 1, for example, has disclosed a technology of forming a battery pack by: forming a battery module by arranging multiple batteries; and arranging such battery modules. Particularly, such a battery pack is installed in electric cars for use as drive sources for their motors.

CITATION LIST

Patent Literature

Patent Literature 1: Japanese Patent Unexamined Publication No. 2007-165164

SUMMARY OF THE INVENTION

However, the conventional battery pack has a problem that the overall volume of the battery pack becomes large if a side from which various brackets and the like protrude is different from a side on which accessories such as a battery controller are disposed.

An object of the present invention is to provide a battery pack reduced in overall volume.

A battery pack of the present invention is characterized by including: paired supporting members disposed with a predetermined interval in between; a battery module disposed between the supporting members; and a stack member supporting the battery module by linking the supporting members to each other, and characterized in that: an extending portion protruding from the battery module is formed by extending an end portion of the stack member in an extending direction of the stack member; the supporting member and the extending portion of the stack member are connected to each other by a supporting bracket; and accessories are attached to at least a side surface on a side where the extending portion of the stack member is disposed, the side surface being one of side surfaces of the battery pack which are provided with the paired supporting members. Note that the battery module of the present invention is not limited to one formed from multiple batteries, but includes one formed of a single battery.

BRIEF DESCRIPTION OF DRAWINGS

FIG. 13($a$) is a side view thereof, FIG. 13($b$) is a front view thereof, and FIGS. 13($c$) and 13($d$) are side views of pin members.

FIG. 14($a$) is a side view thereof, and FIG. 14($b$) is a front view thereof.

DESCRIPTION OF EMBODIMENTS

Embodiments of the present invention will be described below in detail together with the drawings. Note that descriptions will be given of a first embodiment and a second embodiment as a battery pack to be installed in an electric car being an example of a vehicle. However, the battery pack can be installed in other vehicles such as a hybrid car including a motor and an engine. Moreover, descriptions are given below of a battery pack in which battery modules each obtained by arranging multiple batteries in a thickness direction of the batteries are vertically stacked. However, the present invention can be applied to a battery pack in which individual batteries are vertically stacked.

First Embodiment

Figure 1:
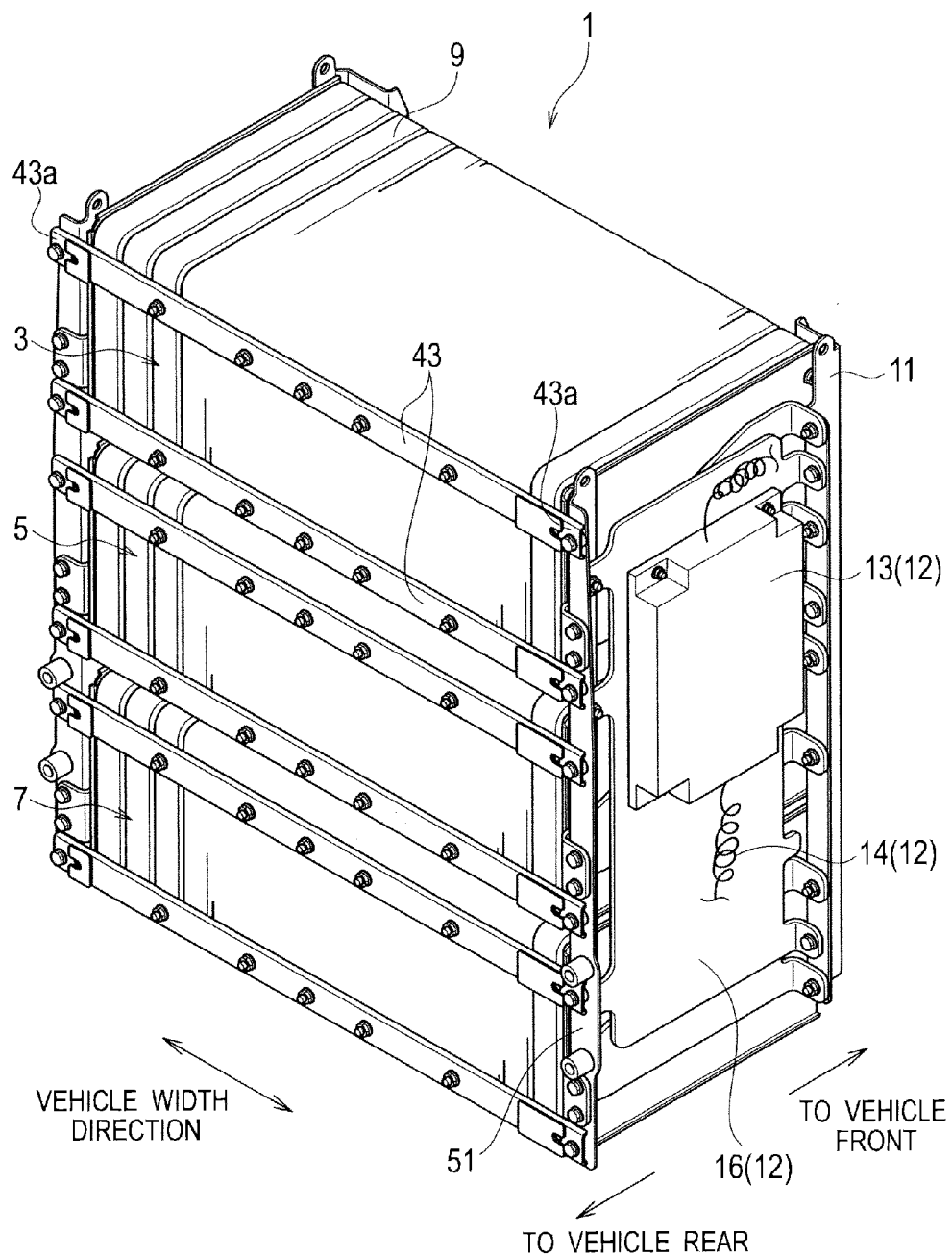
FIG. 1 is a perspective view showing a battery pack of a first embodiment of the present invention.

FIG. 1 is a perspective view showing a battery pack of a first embodiment of the present invention.

A battery pack 1 of the embodiment includes: three battery modules 3, 5, 7 stacked vertically; and accessories 12 attached to side portions of the respective battery modules 3, 5, 7. The battery pack 1 in an on-vehicle state is disposed in a way that a vehicle front side, a vehicle rear side, and a vehicle width direction are as shown by their respective arrows in FIG. 1. Three battery modules include: the upper battery module 3 disposed in the uppermost tier: a center battery module 5 disposed in the middle in a height direction; and the lower battery module 7 disposed in the lowermost tier. These battery modules 3, 5, 7 are connected to each other by elongated supporting plates 11 extending in a vertical direction and supporting brackets 51, which will be described later. Moreover, in each of the battery modules 3, 5, 7, multiple plate-shaped batteries 9 are arranged in parallel in the vehicle width direction (in the thickness direction of the batteries 9), and are connected to each other. Furthermore, the aforementioned accessories 12 include, specifically, a battery controller (for example, a lithium-ion battery controller) 13, wire harnesses 14, an attachment plate 16 to which to attach the battery controller 13, and the like.

Figure 2:
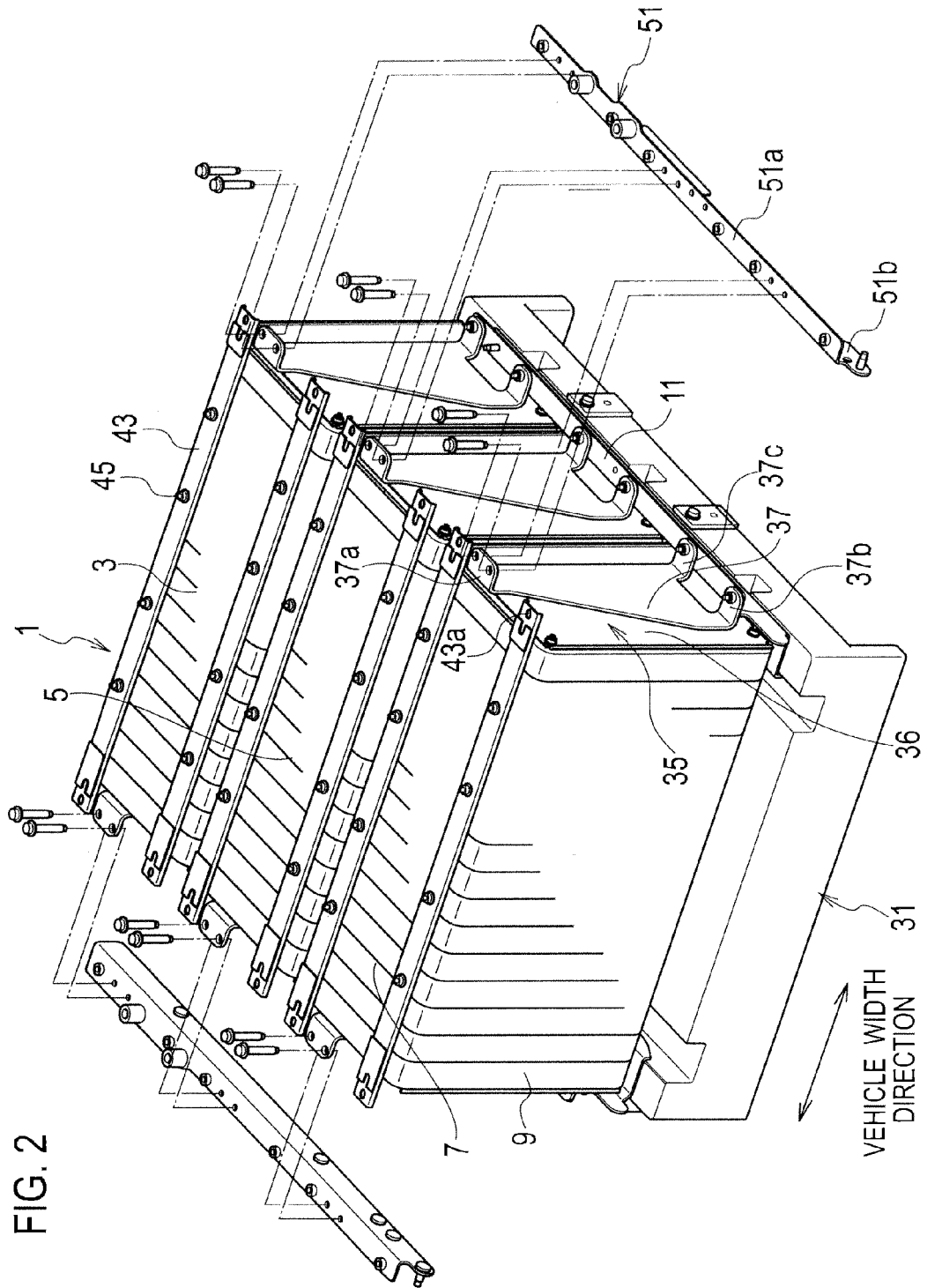
FIG. 2 is a perspective view showing a process of assembling the battery pack of the first embodiment of the present invention.

FIG. 2 is a perspective view showing a process of assembling the battery pack.

The supporting plates 11 are fastened by bolts to a pallet jig 31 placed on a floor surface. End plates 36 being parts of supporting members 35 are fastened to the supporting plates 11 by bolts. Each supporting member 35 is formed from a corresponding one of the end plates 36 and reinforcement member 37. Specifically, the reinforcement members 37 are joined to the end plate 36. Moreover, bent portions 37b, 37c bent and extending in a lateral direction (a substantially horizontal direction) are provided to the lower end of each reinforcement member 37, and a bent portion 37a bent and extending in the lateral direction (the substantially horizontal direction) is provided to the upper end of the reinforcement member 37. The bent portions 37b, 37c are fastened to a corresponding one of the supporting plates 11 by bolts.

Furthermore, both end portions of each of stack members 43 in a longitudinal direction are extended to form extending portions 43a which overhang (protrude) from the battery modules 3, 5, 7. The stack members 43 support the battery modules 3, 5, 7 by use of bolts 45 and connecting members, which are not illustrated.

The paired supporting members 35 formed from the end plate 36 and the reinforcement members 37 are provided, respectively, on the two endmost side surfaces of the battery module 3 in the vehicle width direction. The accessories 12 (see FIG. 1) are provided on at least a side surface situated on a side where the extending portions 43a of the stack members 43 are disposed, which is one of the side surfaces on which the supporting members 35 are disposed. In the embodiment, the supporting members 35 are provided respectively on both sides in the vehicle width direction, and the extending portions 43a of the stack members 43 are provided on both sides. Thus, the attachment plate 16, the battery controller 13, and the wire harnesses 14 connected to the battery controller 13, which constitute the accessories 12, are disposed on the side surfaces of both supporting members 35, 35.

Note that each of the battery modules 3, 5, 7 is formed by arranging the plate-shaped batteries 9 side by side in the thickness direction. Multiple terminals (not shown) are provided on the upper surfaces of the batteries 9. Moreover, as shown in FIG. 2, each of the supporting brackets 51 is integrally formed from an upper surface 51a and a side surface 51b formed by being bent in a direction orthogonal to the upper surface 51a, and has an almost L-shape in a side view.

Figure 3:
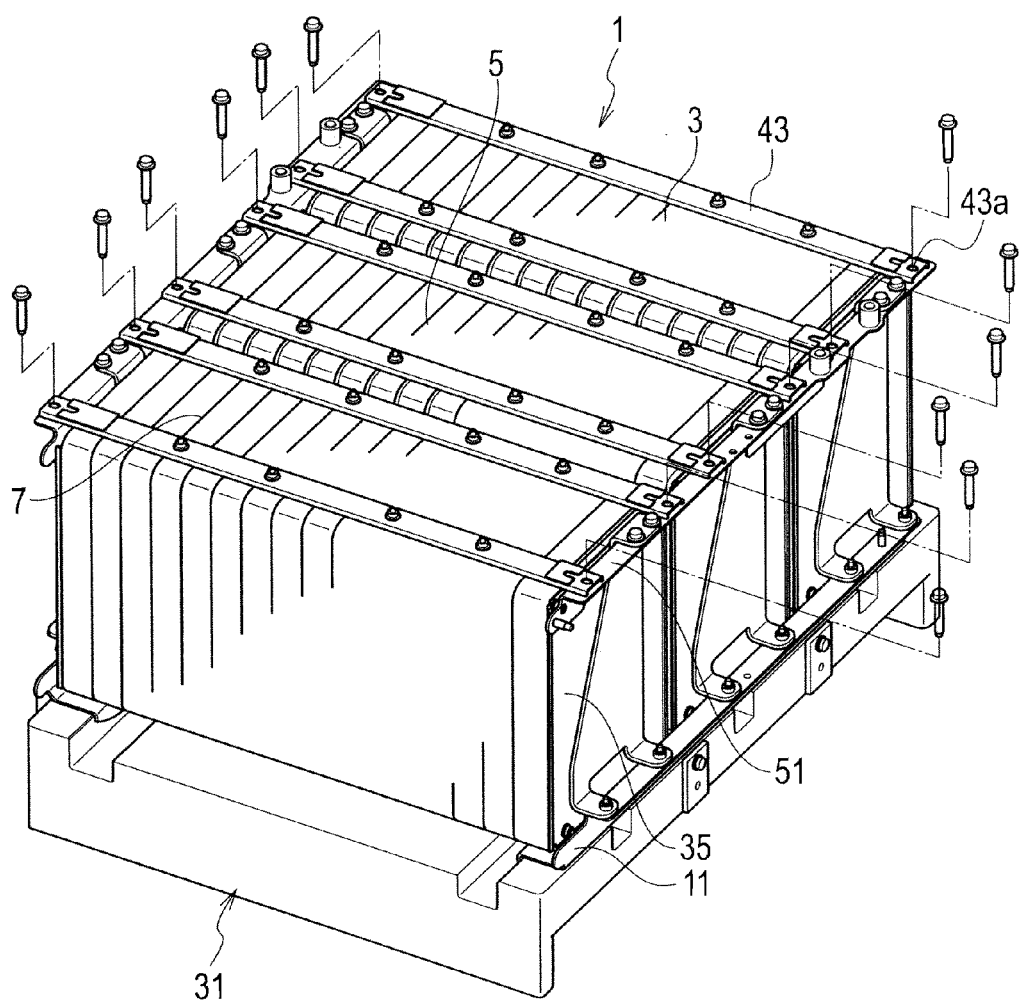
FIG. 3 is a perspective view showing the battery pack of the first embodiment of the present invention which is an assembled end product.

In addition, as shown in FIG. 2, the supporting brackets 51 are attached, from below, to the extending portions 43a of the stack members 43 and the bent portions 37a of the reinforcement members 37. A corner portion, which is shaped almost like the letter L in the side view, is formed, in an upper end portion of the side surface of each supporting member 35, by the extending portions 43a of the corresponding stack member 43 and the bent portion 37a of the corresponding reinforcement member 37. The upper surfaces 51a of the supporting brackets 51 are pressed against the lower sides of the extending portions 43a and the lower sides of the bent portions 37a, and the supporting brackets 51 are fastened to the extending portions 43a and the bent portions 37a by screwing bolts from above. Thus, as shown in FIG. 3, the supporting brackets 51 are attached, from below, to the extending portions 43a of the stack members 43 and the bent potions 37a of the reinforcement members 37 with the supporting brackets 51 matched to the upper end corner portions of the supporting members 35.

Figure 4:
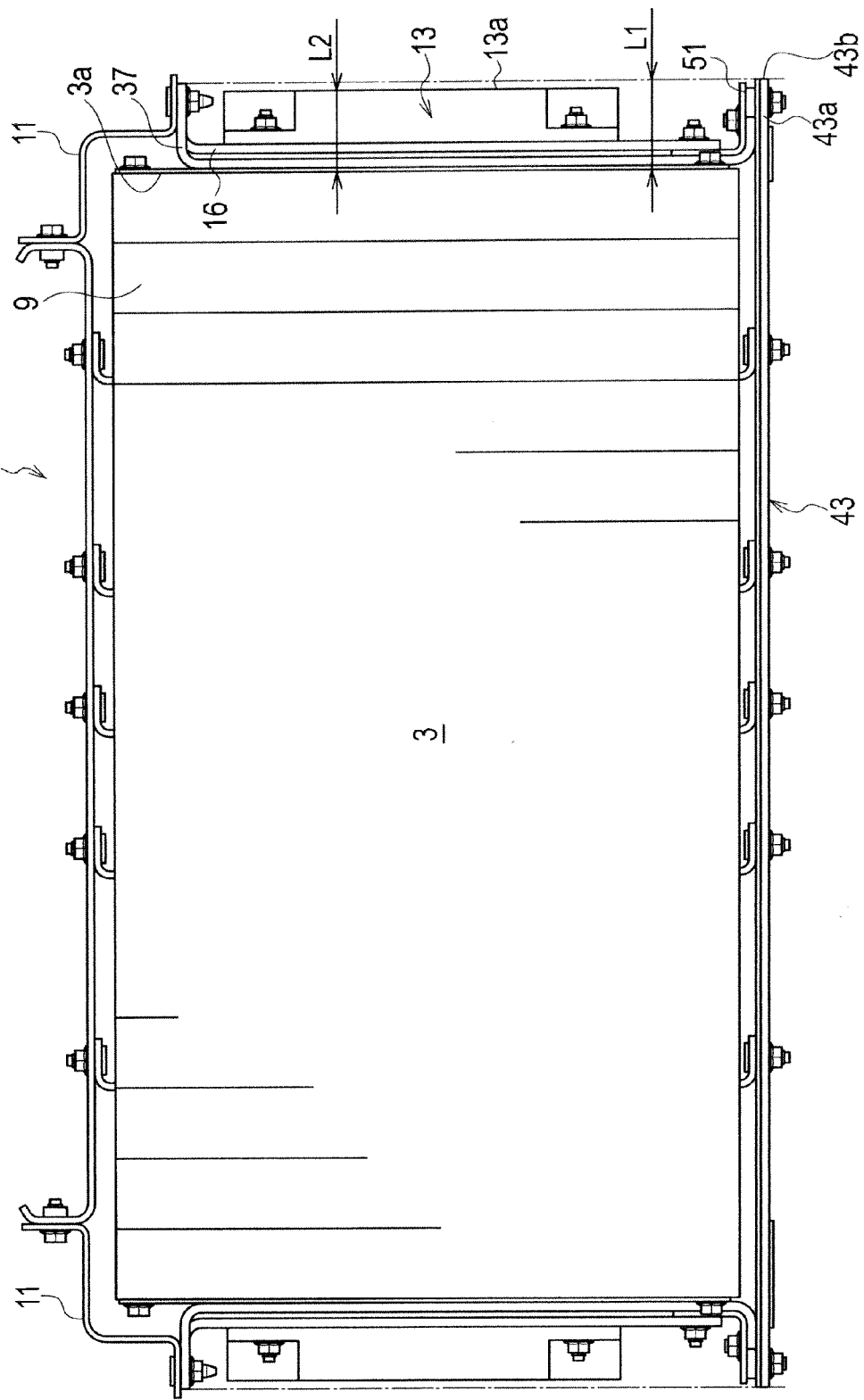
FIG. 4 is a plan view of the battery pack of FIG. 1 which is viewed from above.

FIG. 4 is a plan view showing the battery pack shown in FIG. 1, which is viewed from above.

As shown in FIG. 4, a length L1 by which the extending portion 43a of the stack member 43 protrudes from the upper battery module 3 is set larger than a length L2 by which the battery controller 13 being one of the accessories 12 protrudes from the upper battery module 3.

Specifically, L1 is defined as a length of the extending portion 43a in the extending direction, between an edge 3a of the upper battery module 3 which extends in the thickness direction of the batteries 9 (in an extending direction of the extending portion 43a) and an edge 43b of the extending portion 43a of the stack member 43. Moreover, L2 is defined as a length in the extending direction of the extending portion 43a between the edge 3a of the upper battery module 3 which extends in the thickness direction of the batteries 9 and a side surface 13a of the battery controller 13. In this respect, L1 and L2 are set to satisfy a relationship of L1>L2. Note that the protruding length of each wire harnesses 14, which is not illustrated, is also set smaller than L1.

Operations and effects of the first embodiment will be described below.

(1) The battery pack 1 of the embodiment includes: the paired supporting members 35, 35 disposed with a predetermined interval in between; the battery modules 3, 5, 7 disposed between the supporting members 35, 35; and the stack members 43 linking the supporting members 35, 35, and supporting the battery modules 3, 5, 7. Moreover, the extending portions 43a protruding from the battery modules 3, 5, 7 are formed by extending the end portions of the stack members 43 in the extending direction of the stack members 43. The accessories 12 are attached to at least a side surface on which the extending portions 43a of the stack members 43 are disposed, which is one of the side surfaces on which the respective paired supporting members 35, 35 are provided.

Since the accessories 12 are attached to the side surfaces of the supporting members 35 disposed on the sides provided with the extending portions 43a of the stack members 43 as described above, the overall volume of the battery pack 1 can be reduced.

In other words, if the accessories 12 are disposed on a side surface which is not on the sides on which the extending portions 43a of the stack members 43 are disposed, the volume is increased by the extending portions 43a on the side on which the extending portions 43a are disposed and the volume is increased by the accessories 12 on the side provided with the accessories 12. Thus, disposing the accessories 12 on the side surfaces on the sides on which the extending portions 43a are disposed allows the overall volume of the battery pack 1 to be reduced.

(2) The protruding length L1 of the extending portions 43a of the stack members 43 from the battery modules 3, 5, 7 is set to be larger than the protruding length L2 of the accessories 12 from the battery modules 3, 5, 7.

Thus, when an impact load in the vehicle width direction is applied to the battery pack 1, the extending portions 43a of the stack members 43 can protect the accessories 12.

(3) In the battery pack 1 of the embodiment, the bent portions 37a are formed by laterally bending the upper ends of the reinforcement members 37 joined to the end plates 36, and the extending portions 43a overhanging from the end portions of the battery modules 3, 5, 7 are formed by extending the end portions of the stack members 43. Then, the supporting brackets 51 each having an almost L-shaped cross section are attached, from below, to the bent portions 37a of the reinforcement members 37 and the extending portions 43a of the stack members 43.

As described above, the bent portions 37a of the reinforcement members 37 and the extending portions 43a of the stack members 43 do not protrude toward the terminals of the batteries 9. Thus, wires are easily connected to the terminals, and the entire battery pack 1 can be made compact. Moreover, the accessories 12 can be attached to the side surface of the battery pack 1 which is provided with reinforcement members 37, and the side surface is effectively used.

Second Embodiment

The second embodiment of the present invention will be described by referring to the drawings. In the drawings, FR indicates frontward in a vehicle frontward-rearward direction, and UP indicates upward in a vehicle upward-downward direction.

A battery pack 102 of the embodiment is installed in an electric car, and supplies electricity to a driving motor of the electric car. Note that the battery pack 102 of the embodiment can be installed in other vehicle such as a hybrid car including a motor and an engine.

Figure 5:
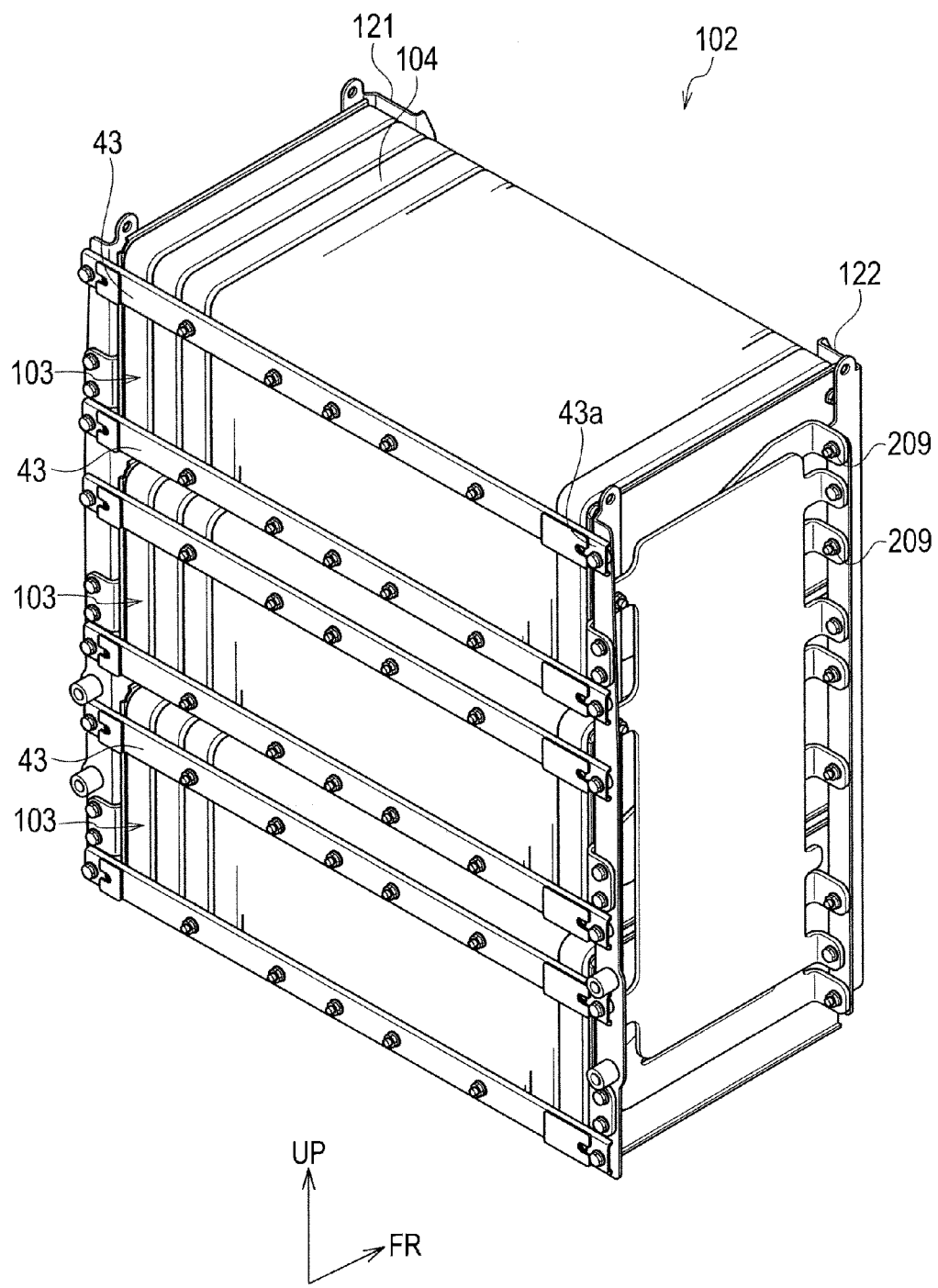
FIG. 5 is perspective view showing a battery pack of a second embodiment of the present invention.

As shown in FIG. 5, the battery pack 102 installed in an electric car (not shown) includes multiple battery modules 103 vertically stacked, and a controller (not shown).

The battery pack of the embodiment includes three battery modules 103, and these battery modules 103 are connected together in series, for example, by use of connection members, which are not illustrated. As shown in FIGS. 6 to 10, each of the battery modules 103 includes: multiple batteries 104 arranged in a row and; a frame 105 holding the multiple batteries 104. The batteries 104 are connected together in series by use of connection members, which are not illustrated.

Figure 11:
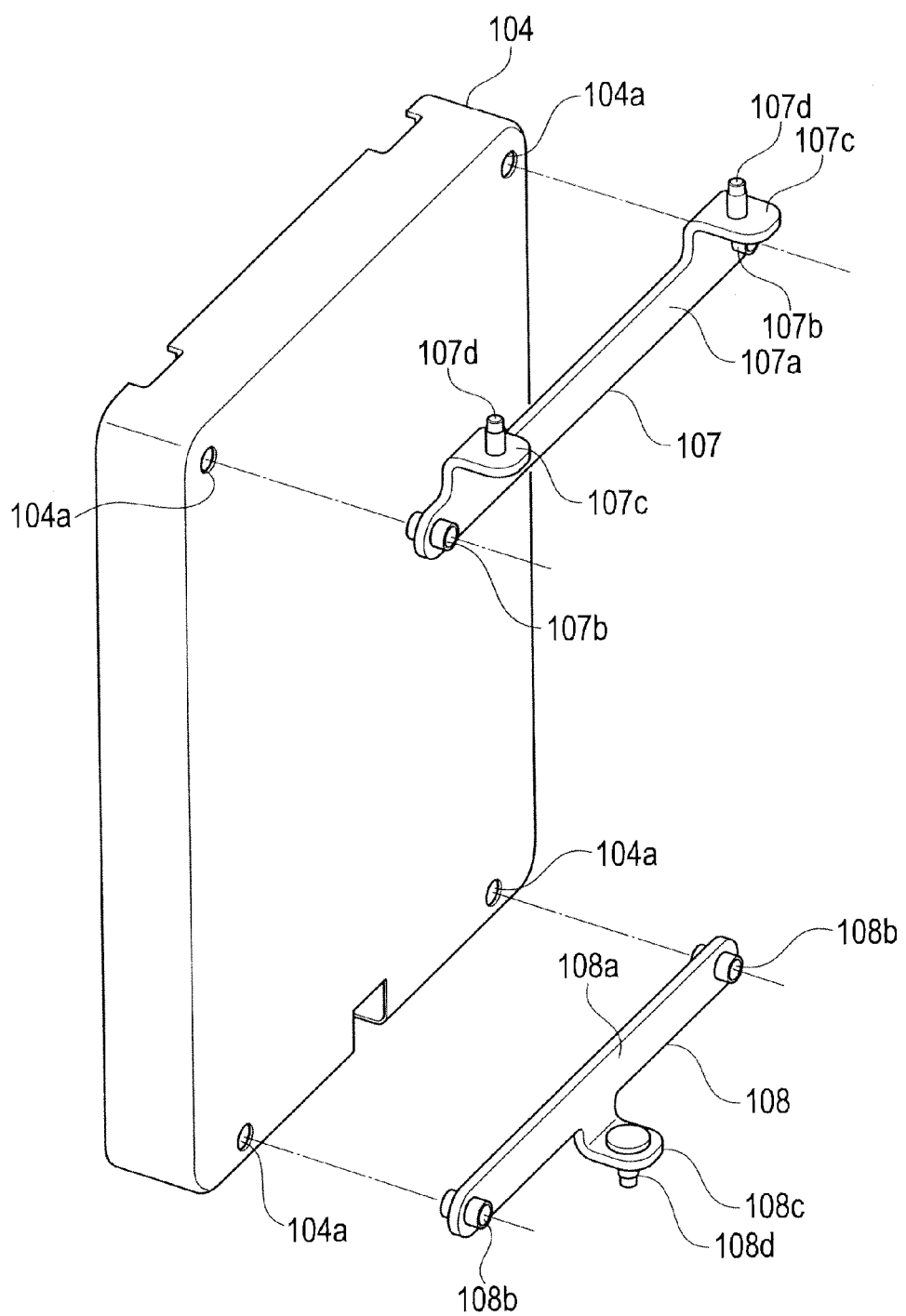
FIG. 11 is an exploded perspective view showing a battery, and first and second connection members of the second embodiment of the present invention.
Figure 12:
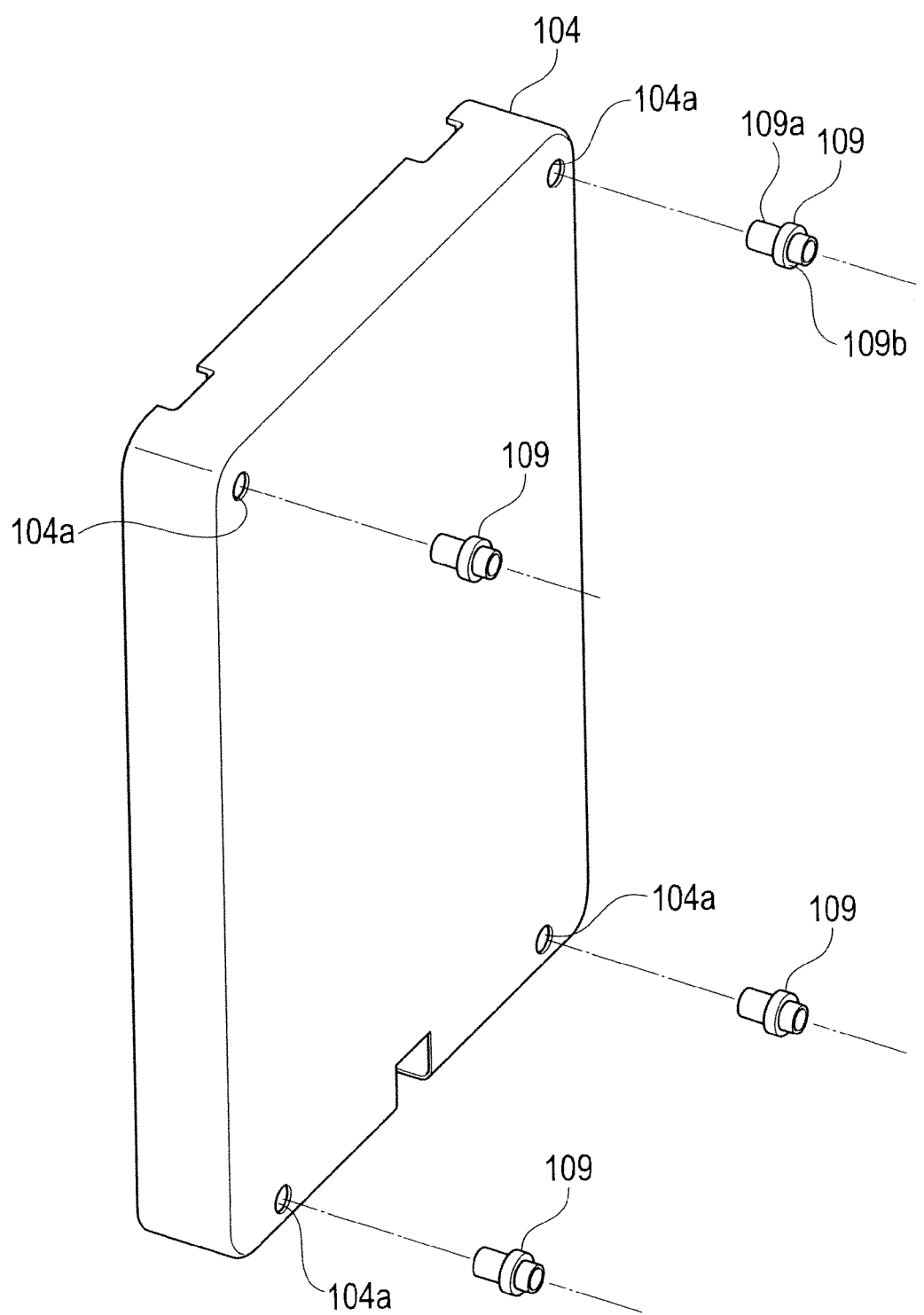
FIG. 12 is an exploded perspective view showing the battery and spacers of the second embodiment of the present invention.

As shown in FIGS. 11 and 12, each of the batteries 104 is formed in a rectangular plate shape, and insertion holes 104a are formed in the respective four corners of the battery 104 in a manner that makes the insertion holes 104a penetrate the battery 104 in a plate-thickness direction. The battery 104 is a secondary battery such as a lithium ion secondary battery, a nickel hydrogen secondary battery, or a nickel cadmium secondary battery. The multiple batteries 104 are arranged side by side in a row (in the thickness direction of the batteries 104). First connection members 107 serving as connection members, second connection members 108 serving as connection members, and spacers 109 are provided between the batteries 104.

One of the first connection members 107 and one of the second connection members 108 are disposed together between each adjacent two of the batteries 104. In other words, the multiple first connection members 107 are arranged in the direction of the row of the batteries 104 with intervals in between, and the multiple second connection members 108 are arranged in the direction of the row of the batteries 104 with intervals in between.

As shown in FIG. 11, the first connection member 107 includes: a plate portion 107a to be interposed between each two adjacent batteries 104; paired cylinder portions 107b penetrating the plate portion 107a; paired attachment portions 107c formed by being bent from the plate portion 107a; and bolt portions 107d fixed to the respective attachment portions 107c. The first connection member 107 is disposed between each two adjacent batteries 104 with end portions of the cylinder portions 107b fitted into the insertion holes 104a of the battery 104 on the front side, and with the plate portion 107a interposed between the adjacent batteries 104. Meanwhile, the second connection member 108 includes: a plate portion 108a to be interposed between each two adjacent batteries 104; paired cylinder portions 108b penetrating the plate portion 108a; an attachment portion 108c formed by being bent from the plate portion 108a; and a bolt portion 108d fixed to the attachment portion 108c. The second connection member 108 is disposed between each two adjacent batteries 104 with end portions of the cylinder portions 108b fitted into the insertion holes 104a of the battery 104 on the rear side, and with the plate portion 108a interposed between the adjacent batteries 104. Thus, the first connection member 107 and the second connection member 108 thus disposed between each two adjacent batteries 104 cause the adjacent batteries 104 to be positioned to each other, and form a gap between the adjacent batteries 104.

The spacers 109 are disposed in a space between the each two adjacent batteries 104 in which neither the first connection member 107 nor the second connection member 108 is disposed. Each of the spacers 109 includes a cylinder portion 109a, and a flange portion 109b provided on the circumferential surface of the cylinder portion 109a. The spacers 109 are disposed between each two adjacent batteries 104, matching the insertion holes 104a of the batteries 104. Each spacer 109 is disposed between each two adjacent batteries 104 with the end portion of the cylinder portion 109a fitted into the corresponding insertion hole 104a of the battery 104, and with the flange portion 109b interposed between the adjacent batteries 104. The spacers 109 thus disposed cause the adjacent batteries 104 to be positioned to each other, and form a gap between the adjacent batteries 104. Moreover, different spacers 110 are disposed between each endmost battery 104 and its corresponding end plate 111.

As shown in FIGS. 6 to 10, the frame 105 includes: paired end plates 111 sandwiching the stacked multiple batteries 104; multiple through-bolts 112 inserted in the end plates 111 and the multiple batteries 104 in the direction of the row of the batteries 104; stack members 43 situated on the outer side of the batteries 104, and extending in the direction of the row of the batteries 104; and a stack plate 114.

The through-bolts 112 are provided, matching the respective insertion holes 104a of each battery 104. The two through-bolts 112 on the rear side are respectively inserted in the cylinder portions 107b of the first connection members 107 and the cylinder portions 109a of the spacers 109 as well.

Meanwhile, the two through-bolts on the front side are inserted in the cylinder portions 108b of the second connection member 108 and the cylinder portions 109a of the spacers 109 as well. Then, nuts 115 are screwed to the through-bolts 102, respectively. Thus, the through-bolts 112 support the multiple batteries 104, and the paired end plates 111 hold the multiple batteries 104 between the end plates 111. While in this state, the two through bolts 112 on the rear side are connected to the first connection members 107, and the two through bolts 112 on the front side are connected to the second connection members 108.

Figure 7:
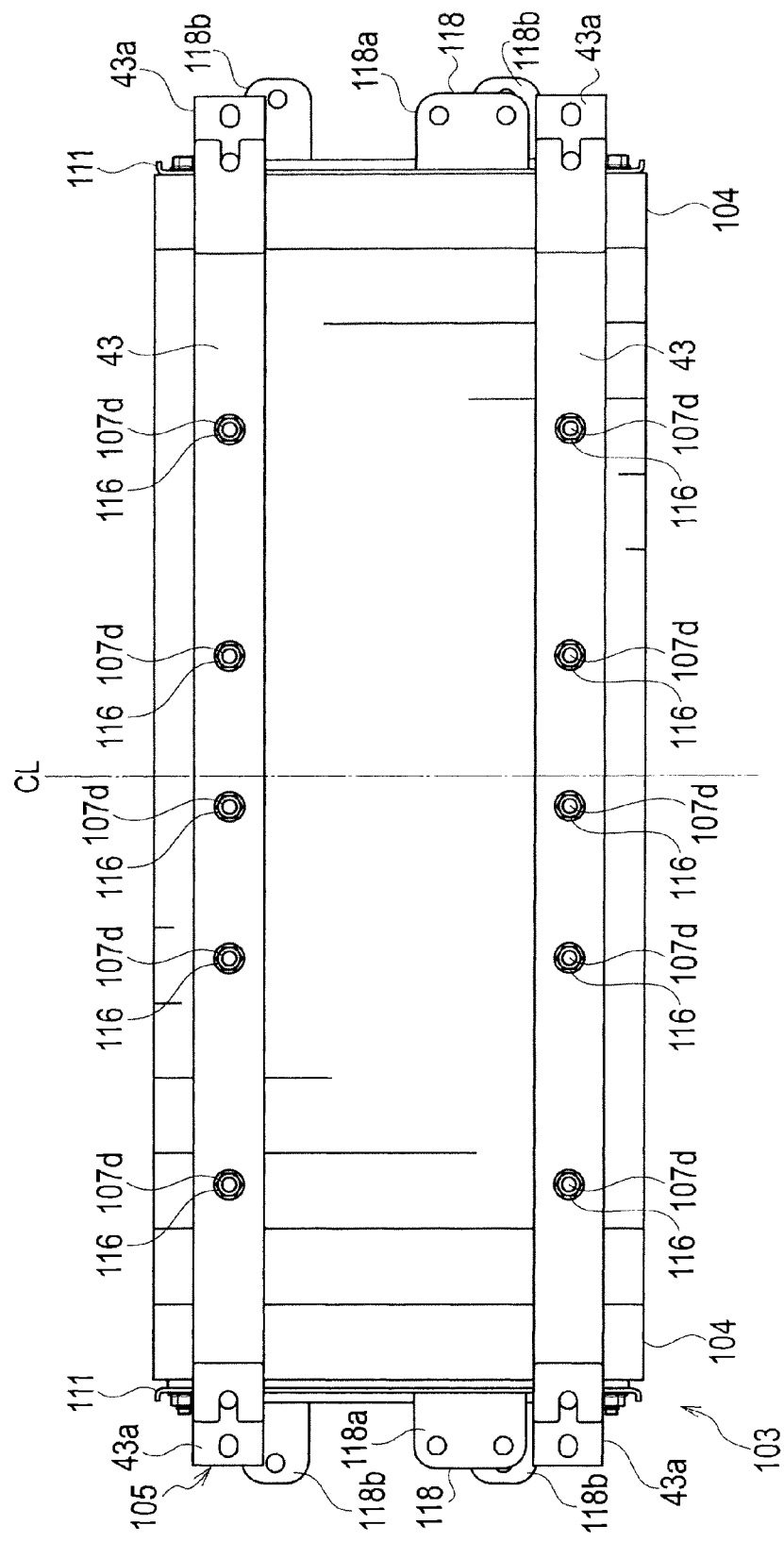
FIG. 7 is a front view showing the battery module of the second embodiment of the present invention.

As shown in FIG. 7, each of the stack members 43 is formed in a band plate-like shape, and is provided on the rear side of the battery module 103. An extending portion 43a is formed in each of the two end portions of the stack member 43. Moreover, multiple first insertion holes (not shown) are formed in the stack members 43, matching the first connection members 107, respectively. The bolt portions 107d of the first connection members 107 are inserted in the first insertion holes, and nuts 116 are screwed to the bolt portions 107d, respectively. Thus, the first connection members 107 are fixed to the stack members 43. In other words, the first connection members 107 link together the stack member 43 and the through-bolts 112 on the front side. Note that a center line CL in FIG. 7 indicates a center position of the battery module 103 in the direction of the row (longitudinal direction).

Figure 8:
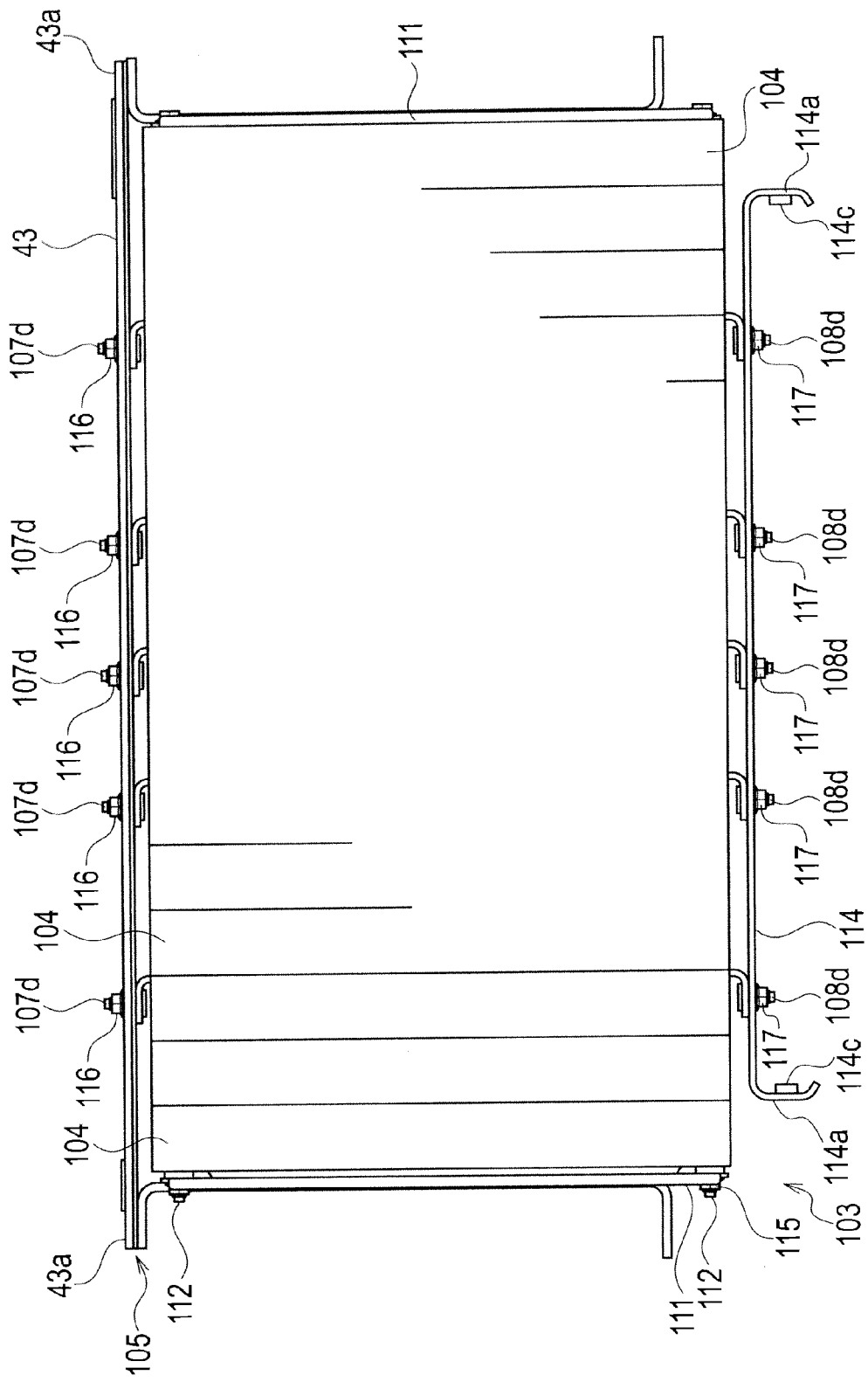
FIG. 8 is a plan view showing the battery module of the second embodiment of the present invention.
Figure 9:
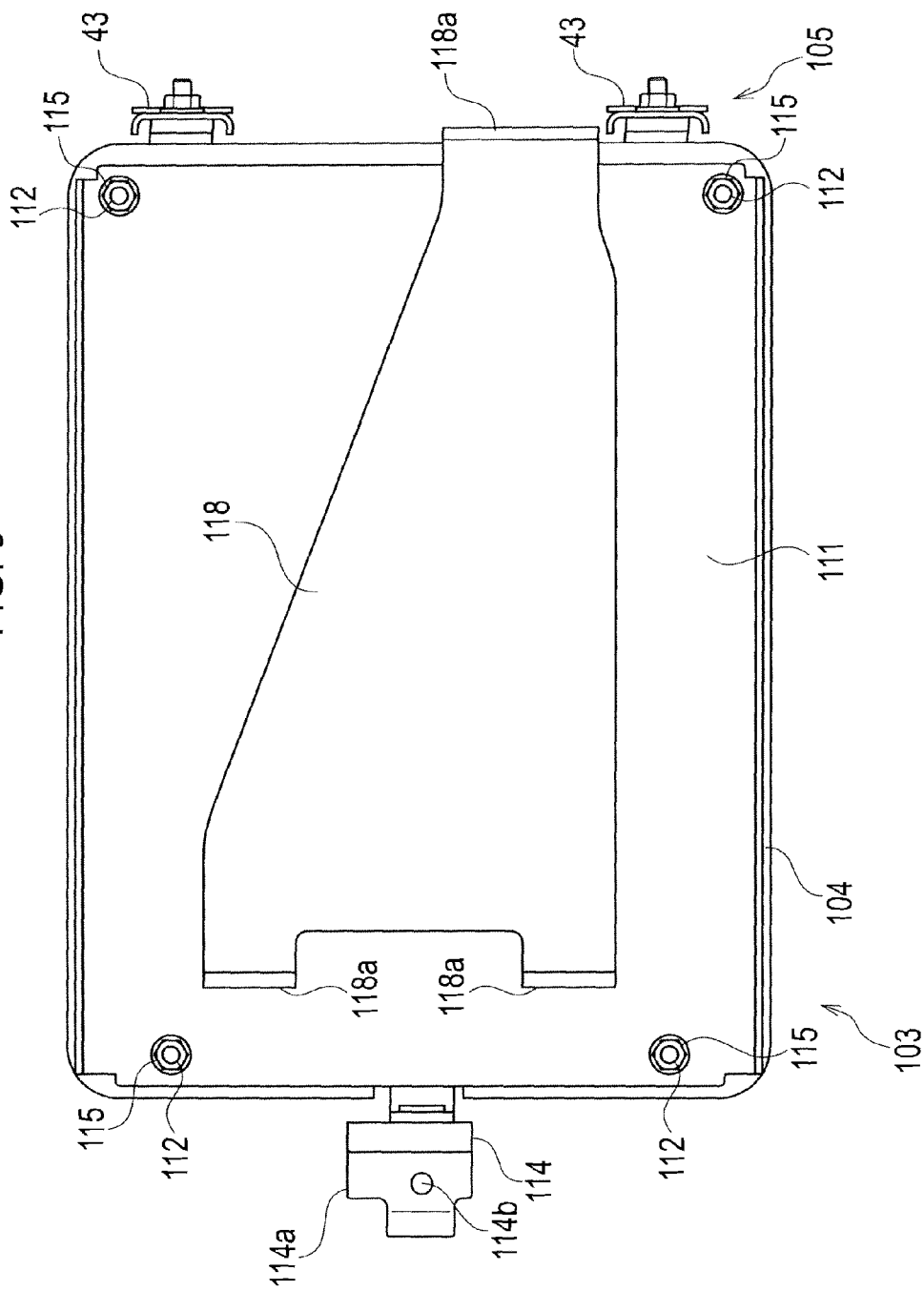
FIG. 9 is a side view showing the battery module of the second embodiment of the present invention.
Figure 10:
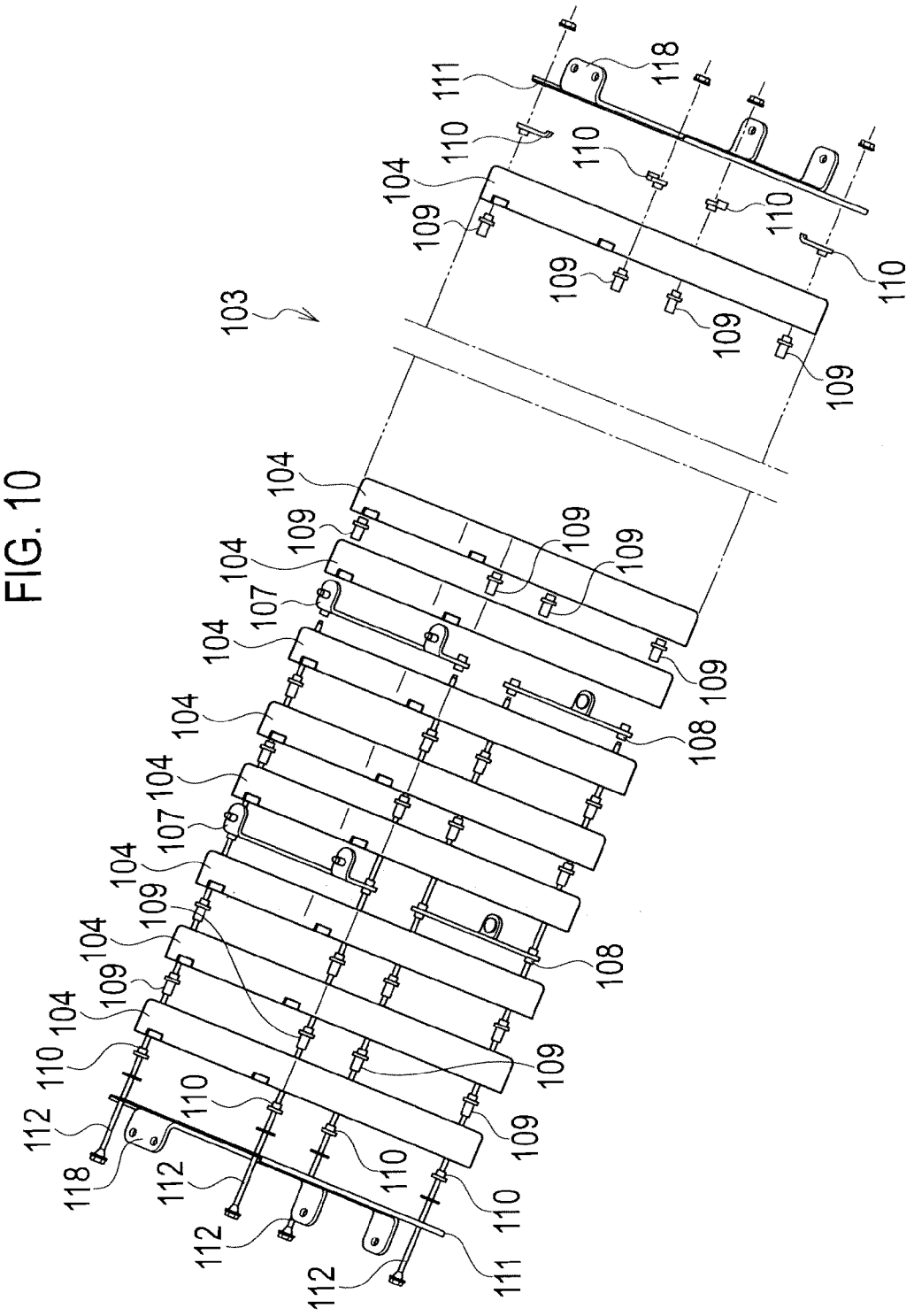
FIG. 10 is an exploded perspective view showing the battery module of the second embodiment of the present invention.

As shown in FIGS. 8 and 9, the stack plate 114 is formed in a band plate-like shape, and is provided on the front side of the battery module 103. An attachment portion 114a is formed in each of the two end portions of the stack plate 114 by bending. An insertion hole 114b is formed in the attachment portion 114a, penetrating the attachment portion 114a in the direction of the row of the batteries 104. A nut 114c is fixed to the attachment portion 114a. The nut 114c communicates with the insertion hole 114b. Moreover, multiple second insertion holes (not shown) are formed in the stack plate 114, matching the second connection members 108, respectively. The bolt portions 108d of the second connection members 108 are inserted in the second insertion holes, and nuts 117 are screwed to the bolt portions 108d, respectively. Thus, the second connection members 108 are fixed to the stack plate 114. In other words, the second connection members 108 link the stack plate 114 and the through-bolts 112 on the front side to each other.

Figure 6:
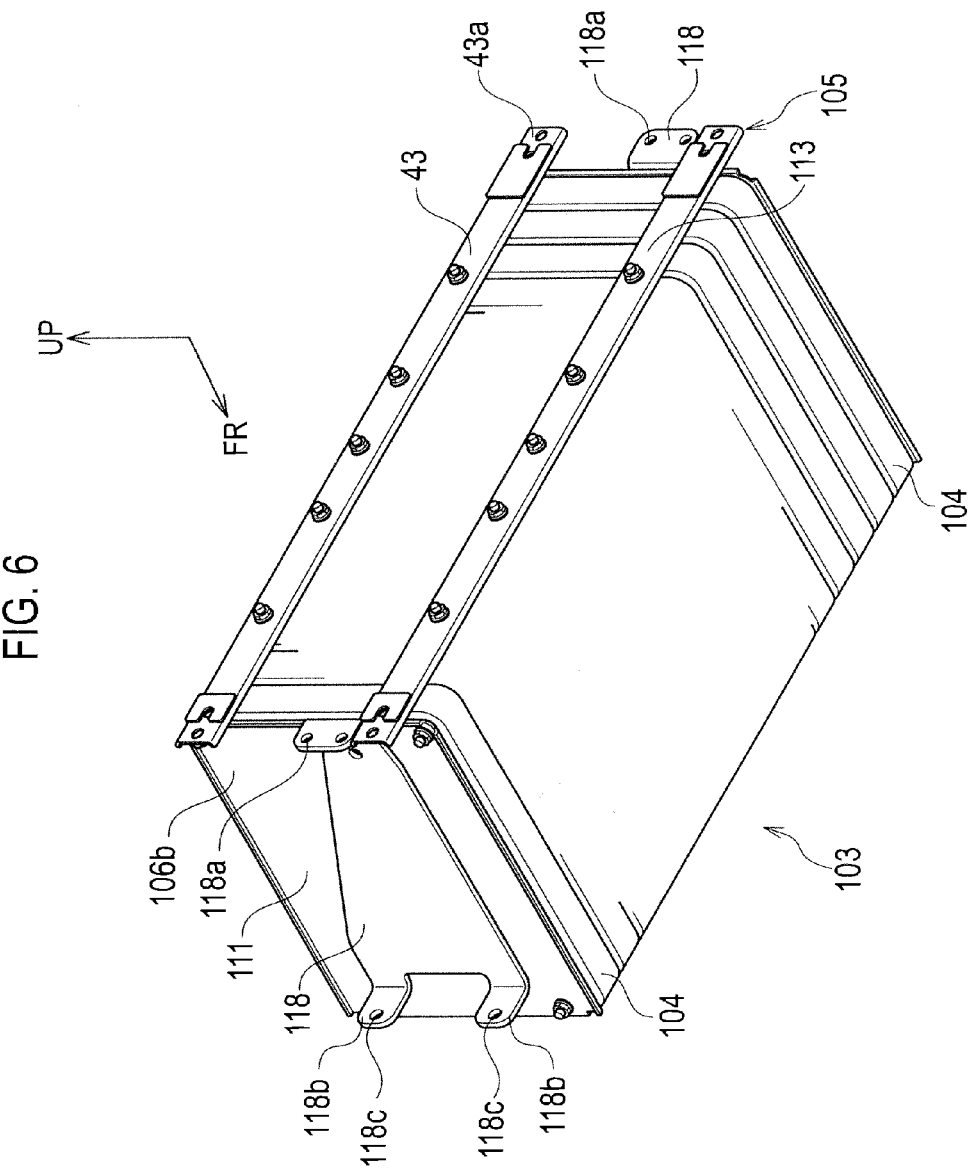
FIG. 6 is a perspective view showing a battery module of the second embodiment of the present invention.

As shown in FIGS. 6 and 9, a reinforcement plate 118 is fixed to each of the end plates 111. A first attachment portion 118a is formed in a stack member 43-side end portion of the reinforcement plate 118 by bending, and paired second attachment portions 118b are formed in a stack plate 114-side end portion of the reinforcement plate 118 by bending. An engagement hole 118c serving as a first engaging portion is formed in each of the second attachment portions 118b.

In the battery module 103 including the multiple batteries 104 and the frame 105, an interval between the connection members (the first connection members 107 and the second connection members 108) adjacent to each other in the direction of the row of the batteries 104 becomes smaller from the ends toward the center in the direction of the row of the batteries 104 of the battery module 103.

Each of the battery modules 103 is supported at both end portions 103b in the direction of the row of the batteries 104. Moreover, each of the stack members 43, the stack plate 114, and the through-bolts 112 are supported at both ends thereof. In this state, a space is provided between each two battery modules 103 vertically adjacent to each other, and a space is provided below the lowermost battery module 103. The batteries 104 are designed to be cooled by the air flowing through these spaces.

A main frame, which is not illustrated, includes first and second pillar members 121, 122 being paired pillar members provided in a manner that makes the first and second pillar members 121, 122 correspond to the respective end portions of the battery module 103 in the direction of the row, and the like, as well as is configured to be fixed to a vehicle body. The first and second pillar members 121, 122 each support the corresponding end portion of the battery module 103.

Figure 13:
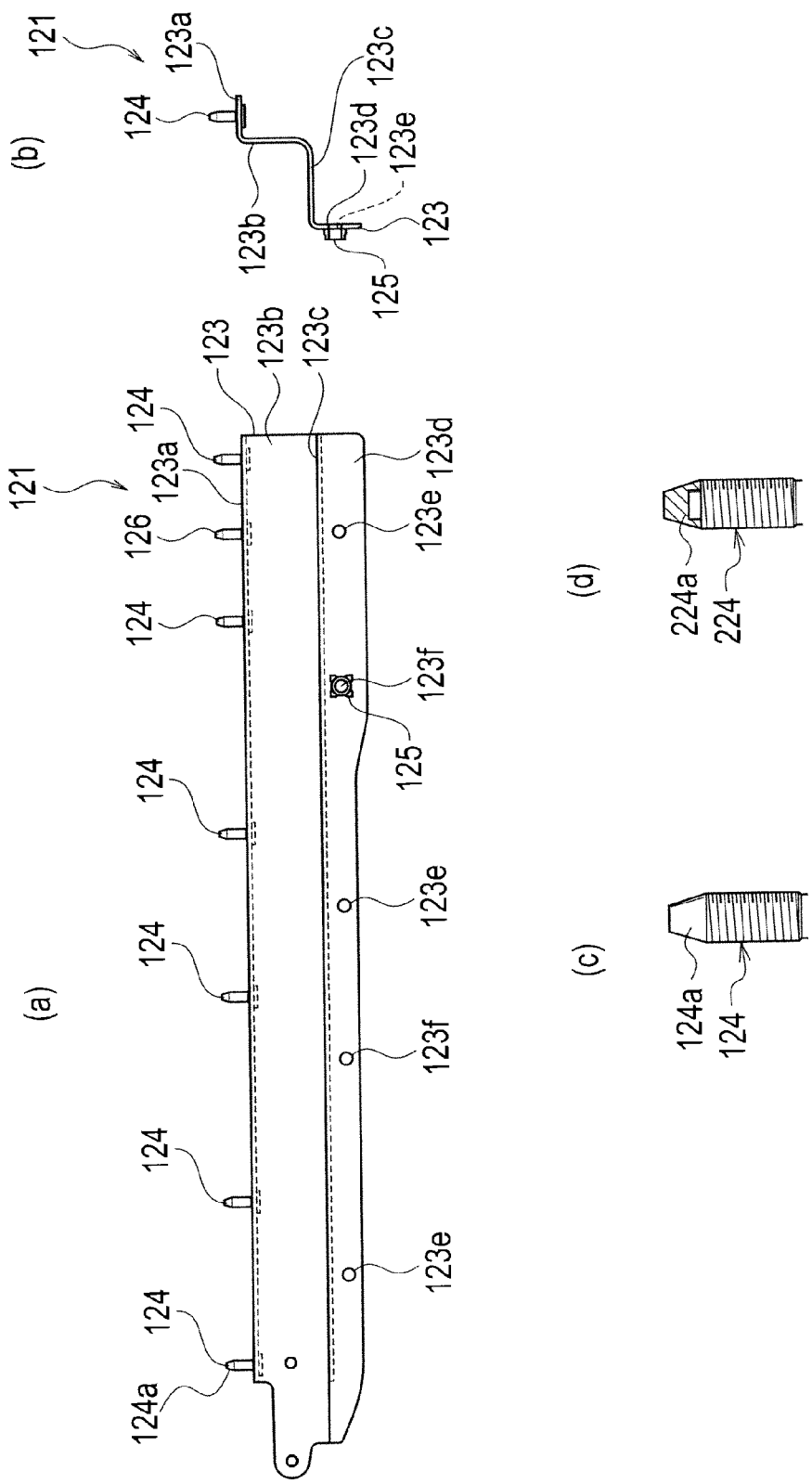
FIG. 13 shows a first pillar member of the second embodiment of the present invention.

As shown in FIGS. 13(a) and 13(b), the first pillar member 121 includes: a pillar main body 123 formed of a plate member; and multiple pin members 124 fixed to the pillar main body 123, and serving as second engagement portions.

As shown in FIG. 13(c), a tapered portion 124a having a circular truncated cone shape whose diameter becomes smaller toward the tip is formed in an end portion of each of the pin members 124. The tapered portion 124a is inserted in and is thus engaged with the corresponding one of the engagement holes 118c of the reinforcement members 118. The pin member 124 is specifically a screw. Note that the tapered portion 124a may be formed integrally with the pin member 124, as shown in FIG. 13(c). Alternatively, like a pin member 224 shown in FIG. 13(d), a separate tapered cap 224a may be fitted to an end of the pin member 224.

The pillar main body 123 is formed of: a first flat plate portion 123a; a second flat plate portion 123b formed by being bent from a side edge of the first flat plate portion 123a; a third flat plate portion 123c formed by being bent from a side edge of the second flat plate portion 123b; and a fourth flat plate portion 123d formed by being bent from the third flat plate portion 123c. Accordingly, the pillar main body 123 has an almost W-shaped cross section.

In the first flat plate portion 123a, the pin members 124 are arranged with an interval between each two adjacent pin members 124 in the longitudinal direction of the first pillar member 121. Moreover, a pin member 126 different from the pin members 124 is also fixed to the first flat plate portion 123a.

In the fourth flat plate portion 123d, insertion holes 123e are formed with an interval between each two adjacent insertion holes 123e in the longitudinal direction of the pillar member 121, and insertion holes 123f are formed with an interval between the insertion holes 123f in the longitudinal direction of the pillar member 121. Each of the insertion holes 123f is positioned between the corresponding two adjacent insertion holes 123e, and one of the insertion holes 123f is provided with a nut 125. The nut 125 is fixed to the fourth flat plate portion 123d by welding or the like, and communicates with the one insertion hole 123f.

The second pillar member 122 is basically the same as the first pillar member 121, and is formed to be right-left symmetrical with respect to the first pillar member.

Figure 14:
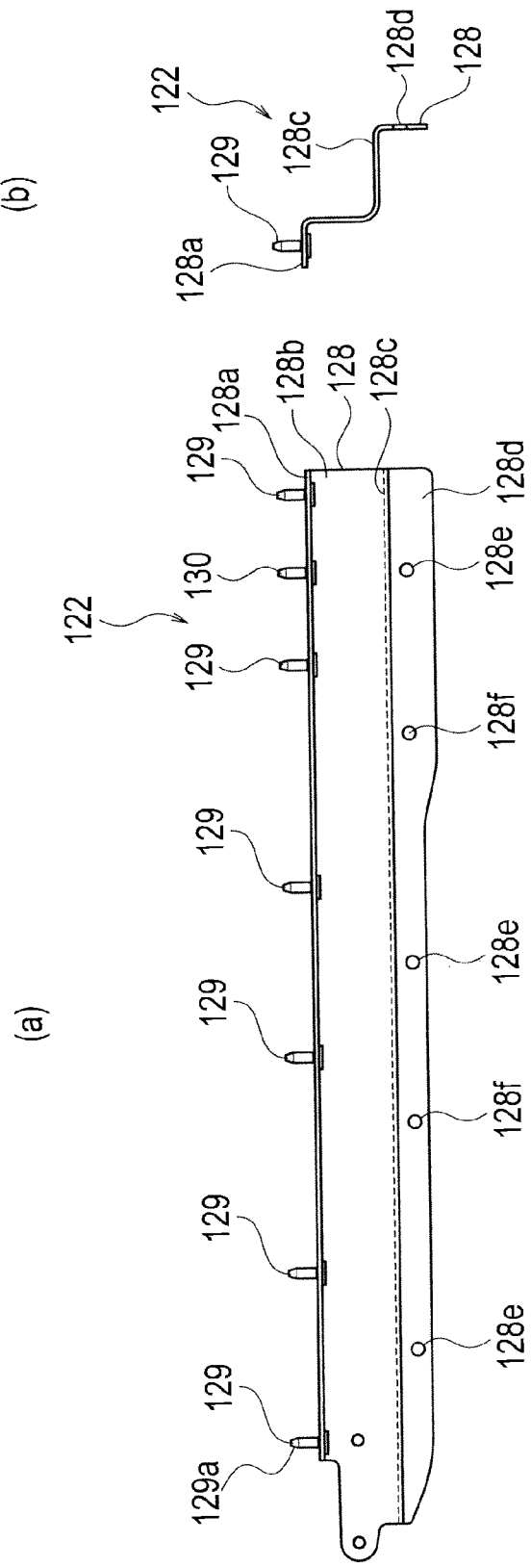
FIG. 14 shows a second pillar member of the second embodiment of the present invention.

As shown in FIGS. 14(a) and 14(b), the second pillar member 122 includes: a pillar main body 128 formed of a plate member; and multiple pin members 129 fixed to the pillar main body 128, and serving as the second engagement portions.

A tapered portion 129a whose diameter becomes smaller toward the tip is formed in an end portion of each of the pin members 129, as in the case of the pin members 124. The tapered portion 129a is engaged with the corresponding one of the engagement holes 118c of the reinforcement members 118 by being inserted in the engagement hole 118c. The pin member 129 is a screw. Note that the tapered portion 129a may be formed integrally with the pin member 129. Alternatively, like the pin member described using FIG. 13, a separate tapered cap (not shown) may be fitted to an end of a pin member.

The pillar main body 128 is formed of: a first flat plate portion 128a; a second flat plate portion 128b formed by being bent from a side edge of the first flat plate portion 128a; a third flat plate portion 128c formed by being bent from a side edge of the second flat plate portion 128b; and a fourth flat plate portion 128d formed by being bent from the third flat plate portion 128c, as well as has an almost W-shaped cross section.

In the first flat plate portion 128a, the pin members 129 are arranged with an interval between each two adjacent pin members 129 in the longitudinal direction of the second pillar member 122. Moreover, a pin member 130 different from the pin members 129 is also fixed to the first flat plate portion 128a.

In the fourth flat plate portion 128d, insertion holes 128e are formed with an interval between each two adjacent insertion holes 128e in the longitudinal direction of the pillar member 122, and insertion holes 128f are formed with an interval between the insertion holes 128f in the longitudinal direction of the pillar member 122. Each of the insertion holes 128f are positioned between the corresponding two adjacent insertion holes 128e. The second pillar member 122 is not provided with a nut which corresponds to the nut 125 of the first pillar member 121.

Figure 15:
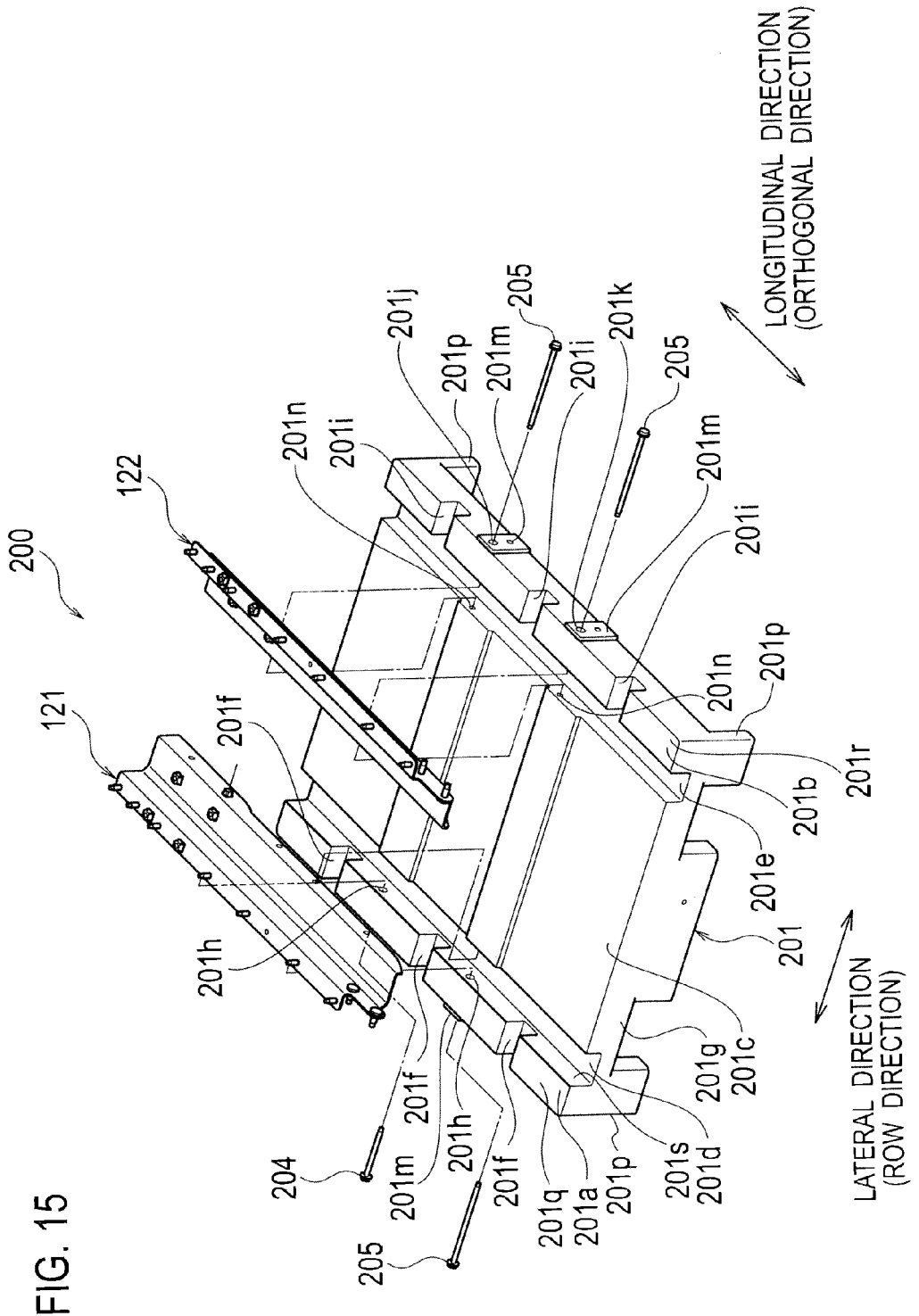
FIG. 15 is a view showing a process of manufacturing the battery pack of the second embodiment of the present invention.

Next, descriptions are given of a method of positioning the battery modules and a method of manufacturing the battery pack. The method of positioning the battery modules is a method of positioning the battery modules 103 and the first and second pillar members 121, 122 relative to one another, the battery modules 103 each including the multiple batteries 104 in a row, the first and second pillar members 121, 122 being the paired pillar members for supporting the end portions of the battery modules 103 in the direction of the row. The battery modules 103 and the first and second pillar members 121, 122 are designed to be capable of being positioned using a jig apparatus 200 shown in FIG. 15.

The jig apparatus 200 includes: a pallet 201; and bolts 204, 205 being turn prevention members for preventing the turn of pillar members 121, 122. Note that in the descriptions below, the lateral direction (right-left direction) and the longitudinal direction of the pallet 201 will be simply referred to as the lateral direction and the longitudinal direction, respectively.

The pallet 201 includes: a base portion 201g shaped like a rectangular plate; and leg portions 201p formed integrally with the respective lower portions of the base portion 201g.

In the upper surface of the base portion 201g, paired supporting portions 201a, 201b extending in the longitudinal direction are formed respectively in both edge portions in the lateral direction, and a block portion 201c is formed between the paired supporting portions 201a, 201b. In the base portion 201g, paired groove portions 201d, 201e are formed respectively in a portion between the supporting portion 201a and the block portion 201c, and in a portion between the supporting portion 201b and the block portion 201c. The groove portions 201d, 201e extend in the longitudinal direction, and are formed with an interval in between in the lateral direction.

Multiple lateral groove portions 201f extending in the lateral direction are formed in the supporting portion 201a. Multiple lateral groove portions 201i extending in the lateral direction are formed in the supporting portion 201b. The lateral groove portions 201f are formed with an interval between each two adjacent lateral groove portions 201f in the longitudinal direction, and the lateral groove portions 201i are formed with an interval between each two adjacent lateral groove portions 201i in the longitudinal direction. Moreover, multiple insertion holes 201h are formed in the supporting portion 201a, and multiple insertion holes 201k, 201j are formed in the supporting portion 201b. The insertion holes 201h are formed with an interval in between in the longitudinal direction, and the insertion holes 201k, 201j are formed with an interval in between in the longitudinal direction. The insertion holes 201h penetrate the supporting portion 201a in the lateral direction, and the insertion holes 201k, 201j penetrate the supporting portion 201b in the lateral direction. The corresponding one of the bolts 204, 205 is inserted into each of the insertion holes 201h, 201k, 201j. In addition, reinforcement plates 201m are provided on the outer surface of each of the supporting portions 201a, 201b, and the insertion holes 201h, 201k, 201j are formed, respectively penetrating the reinforcement plates 201m as well. An upper surface 201r of the right supporting portion 201b functions as a slide support portion for slidably supporting the second pillar member 122 in a way that enables the adjustment of an interval between the first and second pillar members 121, 122 in the direction of the row of the batteries 104, and the adjustment of relative positions of the respective first and second pillar members 121, 122 in the direction orthogonal to the direction of the row of the batteries 104.

Screw holes 201n are formed in both side portions of the block portion 201c, situated coaxial with the respective insertion holes 201h, 201k, 201j which are formed in the supporting portion 201a, 201b. The screw holes 201n are formed, extending in the lateral direction.

In the method of manufacturing the battery pack, the battery modules 103 are mounted on the pallet 201 with the first and second pillar members 121, 122 in between in such a way that: the direction of the row of the batteries 104 coincides with the lateral direction of the pallet 201; and the direction orthogonal to the direction of the row of the batteries 104 coincides with the longitudinal direction of the pallet 201.

Figure 16:
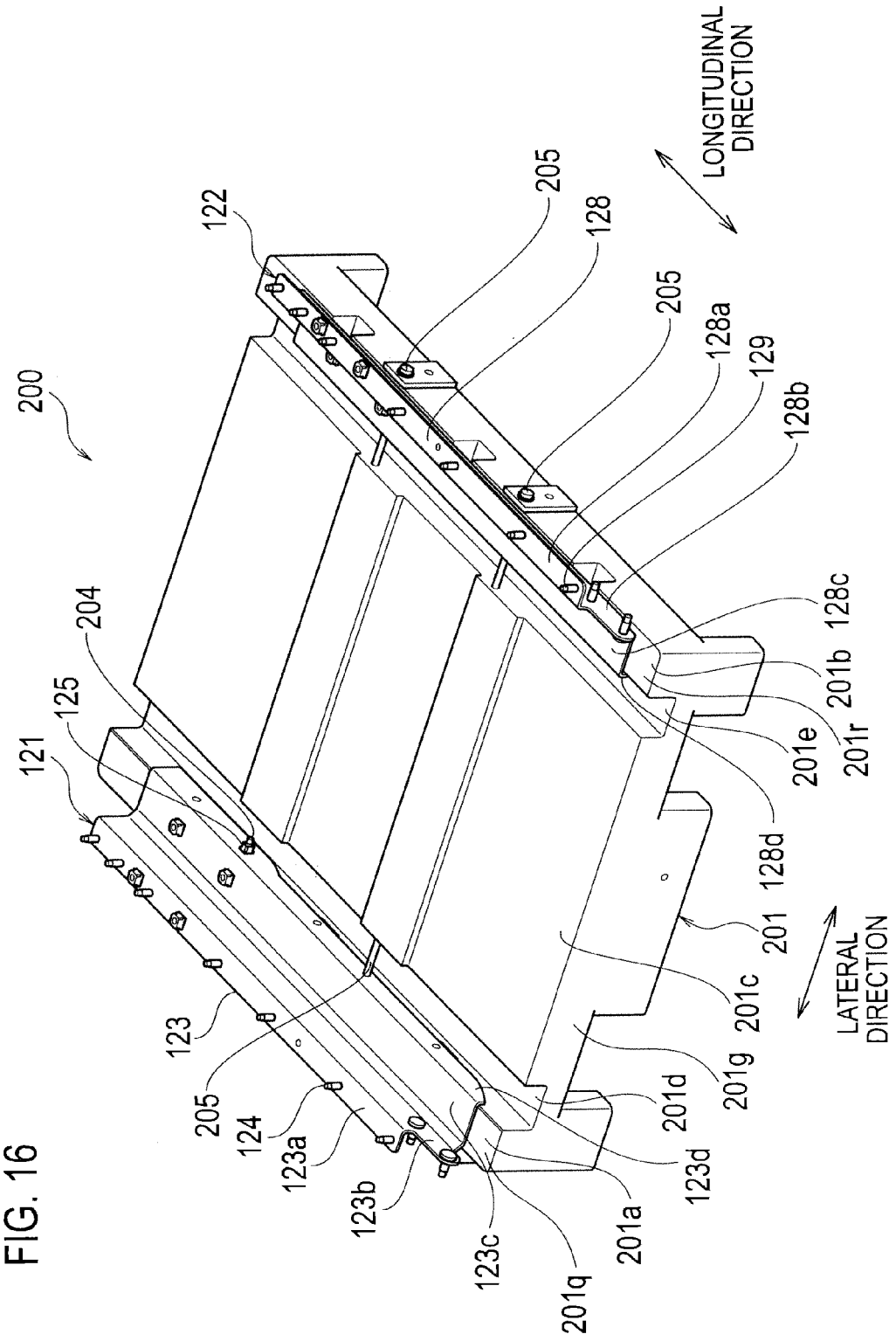
FIG. 16 is another view showing a process of manufacturing the battery pack of the second embodiment of the present invention.

In the method of manufacturing the battery pack, firstly, as shown in FIG. 16, the first and second pillar members 121, 122 are assembled to the jig apparatus 200 (a pillar members assembling step).

To be more specific, the first pillar member 121 is mounted on the one (left) supporting portion 201a, and the second pillar member 122 is mounted on the other (right) supporting portion 201b. At this time, the third flat plate portions 123c, 128c of the first and second pillar members 121, 122 are mounted on upper surfaces 201q, 201r of the supporting portions 201a, 201b, respectively; and the fourth flat plate portions 123d, 128d of the first and second pillar members 121, 122 are brought into contact with inner surfaces 201s (an inner surface of the supporting portion 201b is not shown) of the supporting portions 201a, 201b, respectively.

Then, the bolt 204 is inserted in the insertion hole 201h of the one (left) supporting portion 201a on a far side and in the insertion hole 123f of the first pillar member 121 on the far side. Subsequently, the bolt 204 is screwed to the nut 125. Subsequently, the bolt 205 is inserted in the insertion hole 201h of the supporting portion 201a on a near side and in the insertion hole 123f of the first pillar member 121 on the near side. Thereafter, the bolt 205 is screwed to the corresponding screw hole 201n. Thus, the first pillar member 121 is fixed to the pallet 201.

After that, the bolt 205 is inserted in the insertion hole 201j of the other (right) supporting portion 201b on the far side and in the insertion hole 128f of the second pillar member 122 on the far side. Subsequently, the bolt 205 is screwed to the corresponding screw hole 201n. Concurrently, the bolt 205 is inserted in the insertion hole 201k of the supporting portion 201b on the near side and in the insertion hole 128f of the second pillar member 122 on the near side. Thereafter, the bolt 205 is screwed to the corresponding screw hole 201n. While in this state, the second pillar member 122 is supported by the upper surface 201r of the supporting portion 201b, movable in the longitudinal direction and the lateral direction. To be more specific, the second pillar member 122 is movable in a direction toward the first pillar member 121, which is the lateral direction. Thus, the second pillar member 122 is slidably supported by the upper surface 201r of the supporting portion 201b in a way that enables the adjustment of the interval between the first and second pillar members 121, 122 in the lateral direction (the direction of the row of the batteries 104), and the adjustment of the relative positions of the respective first and second pillar members 121, 122 in the longitudinal direction (the direction orthogonal to the direction of the row of the batteries 104) are adjustable. In this configuration, the diameter of each of the insertion holes 123f, 128f of the first and second pillar members 121, 122 is formed, larger than the diameter of a shaft portion of the bolts 205, and there is a backlash between each of the insertion holes 123f, 128f and their corresponding bolts 205. Accordingly, the insertion holes 128f allow the second pillar member 122 to move in the lateral direction (the direction of the row of the batteries 104) and in the longitudinal direction (the direction orthogonal to the direction of the row of the batteries 104), with the bolts 205 being inserted. Moreover, while in this state, the turn of the first pillar member 121, specifically the turn thereof about an imaginary axis extending in the longitudinal direction, is prevented by the bolts 204, 205. In addition, the turn of the second pillar member 122, specifically the turn thereof about an imaginary axis extending in the longitudinal direction, is prevented by the bolts 205.

Figure 17:
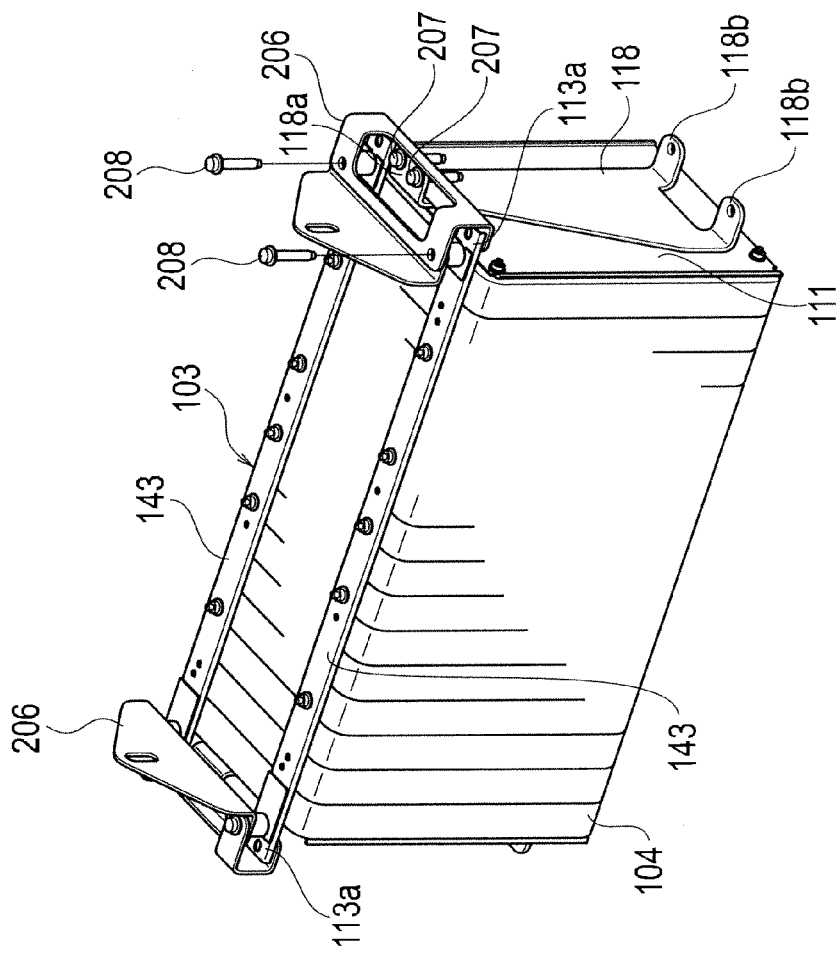
FIG. 17 is another view showing a process of manufacturing the battery pack of the second embodiment of the present invention.

Next, as shown in FIG. 17, slingers 206 are fixed to the two respective end portions of the battery module 103 by bolts 207, 208.

Figure 18:
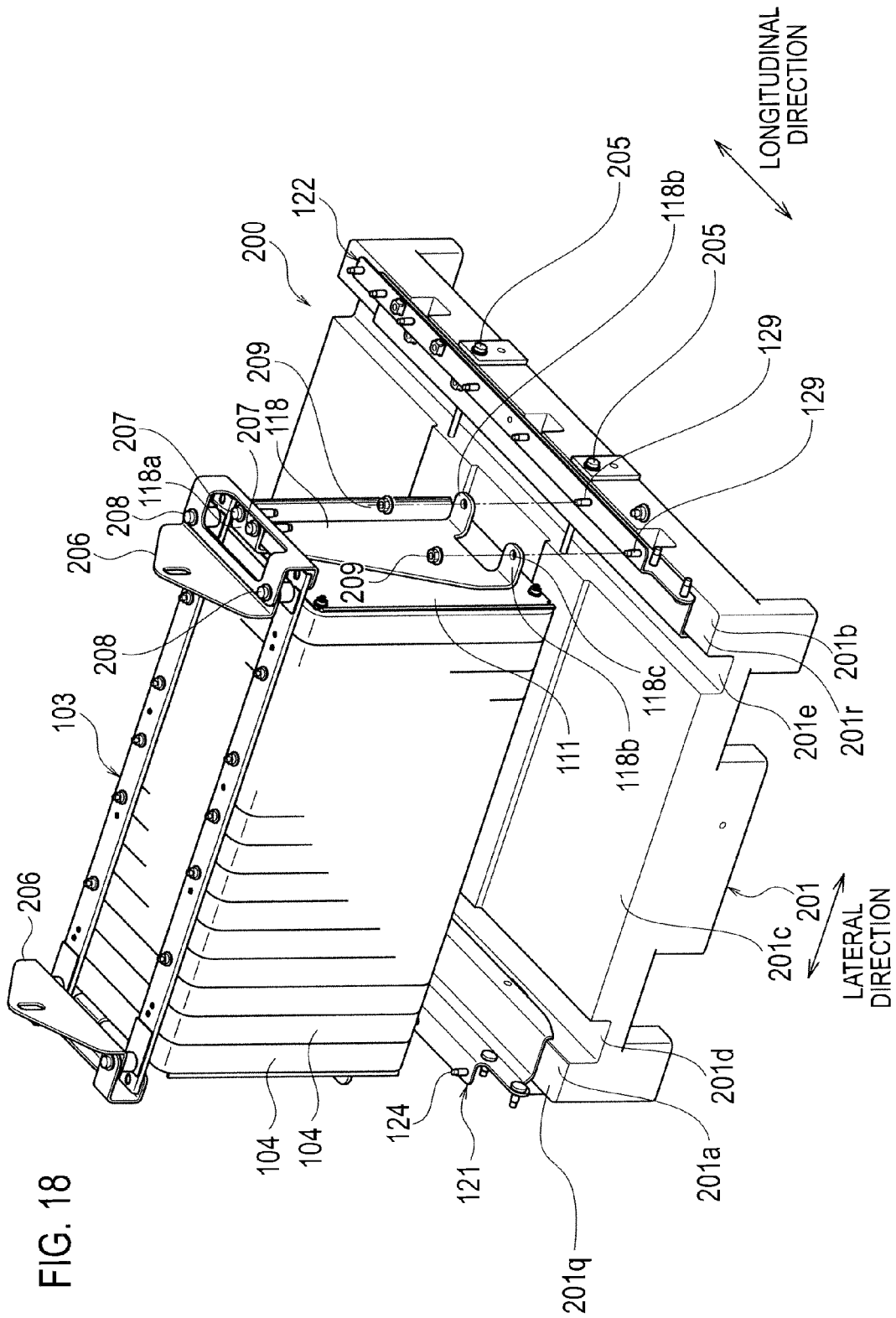
FIG. 18 is another view showing a process of manufacturing the battery pack of the second embodiment of the present invention.
Figure 19:
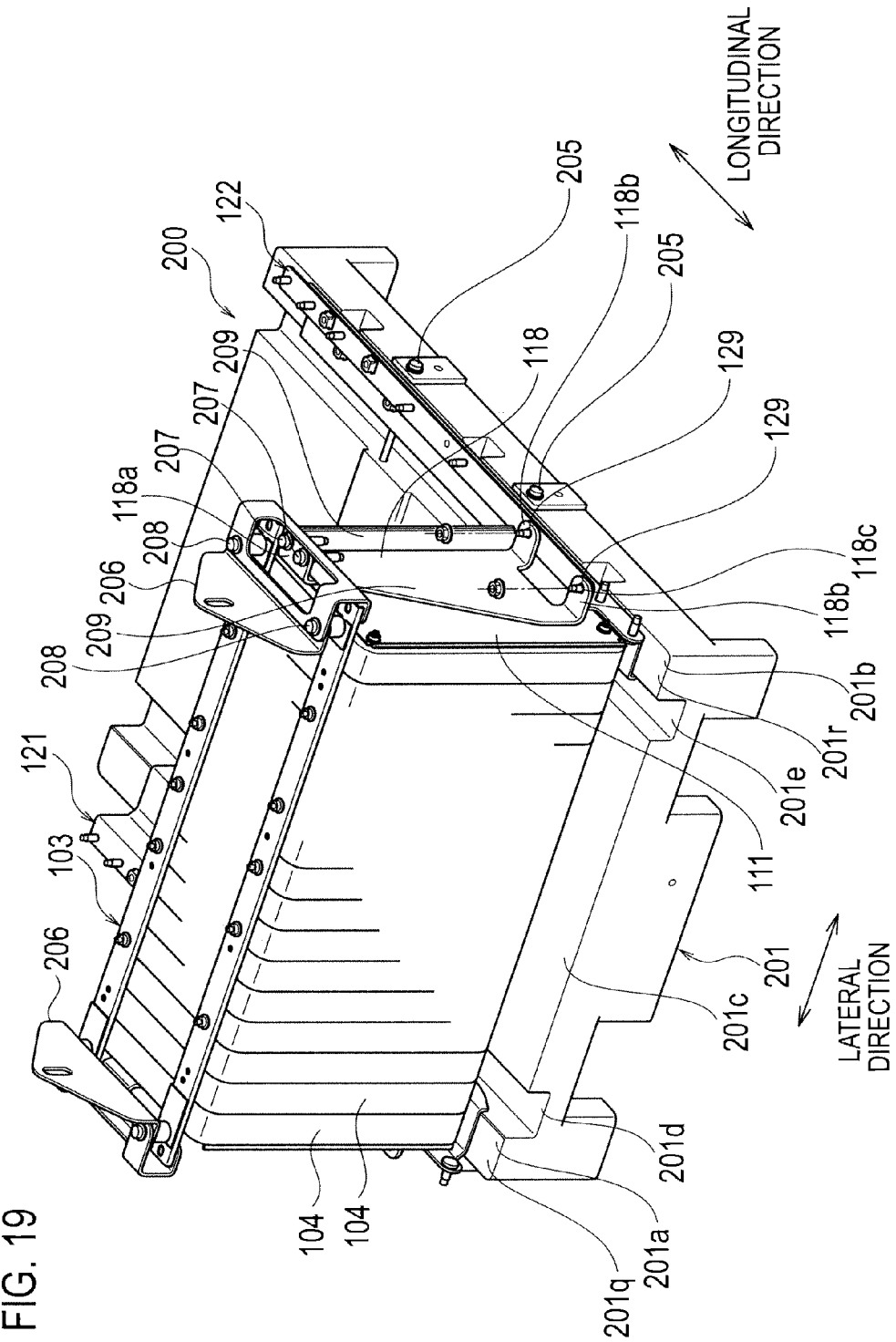
FIG. 19 is yet another view showing a process of manufacturing the battery pack of the second embodiment of the present invention.
Figure 20:
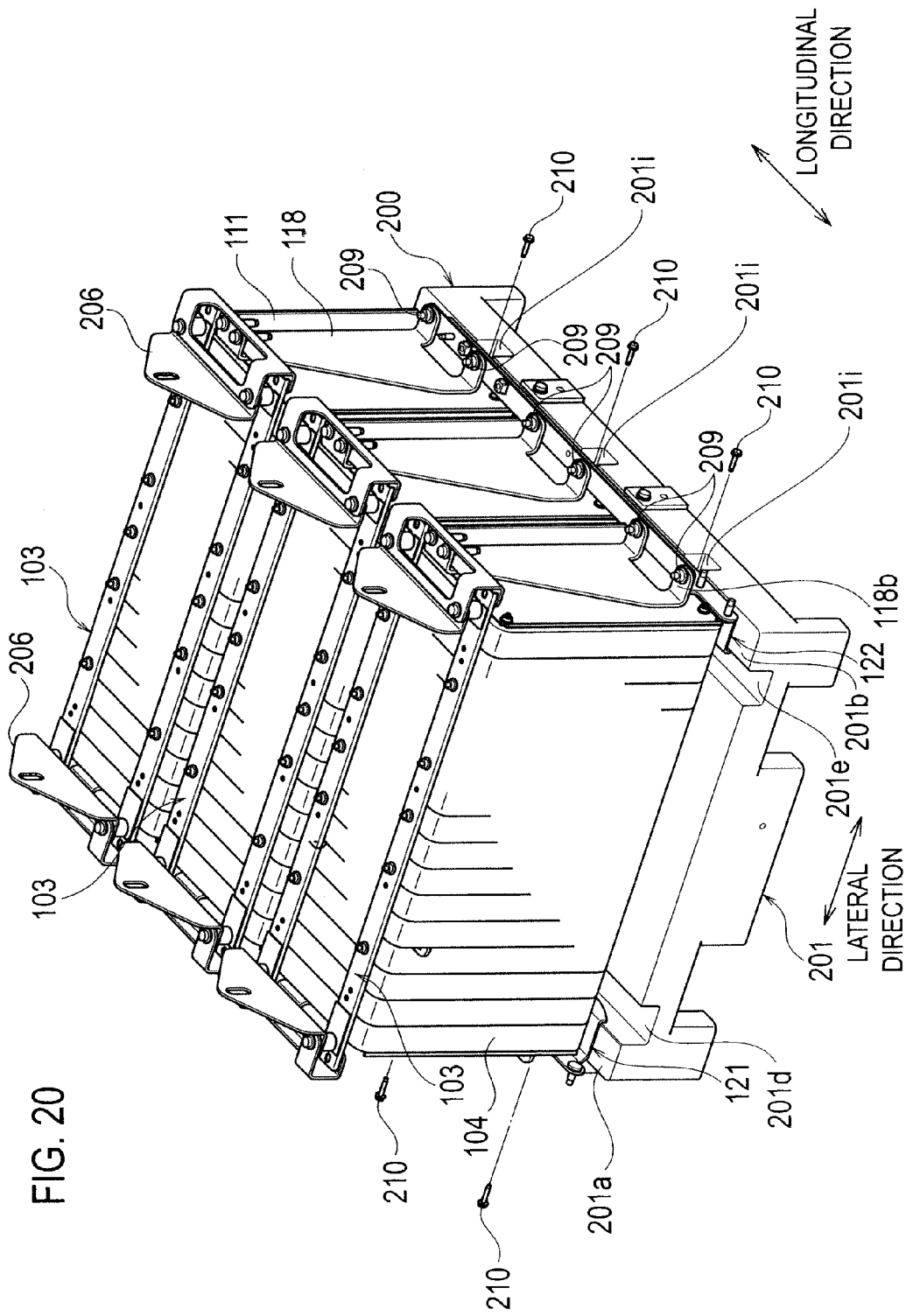
FIG. 20 is still another view showing a process of manufacturing the battery pack of the second embodiment of the present invention.

Subsequently, as shown in FIG. 18, the slingers 206 are hooked to a crane (not shown), and the battery module 103 is moved to a position above the jig apparatus 200 by the crane. Then, as shown in FIGS. 19 and 20, the battery module 103 is lowered (moved) toward the first and second pillar members 121, 122 assembled to the jig apparatus 200. Thereafter, the pin members 124, 129 of the first and second pillar members 121, 122 are engaged with the insertion holes 118b of the battery module 103, and the first and second pillar members 121, 122 and the battery module 103 are positioned relative to one another (a relative positioning step). At this time, the tapered portions 129a of the pin members 129 are inserted into the insertion holes 118b while being in contact with the insertion holes 118b, and this causes the second pillar member 122 to be automatically positioned to the battery module 103.

After the positioning is completed in the foregoing manner, nuts 209 are screwed to the pin members 124, 129, respectively, and the battery module 103 is thereby fixed to the first and second pillar members 121, 122 (a fixing step). The remaining two battery modules 103 are positioned and fixed to the first and second pillar members 121, 122 by repeating the foregoing steps (see FIG. 20).

Figure 21:
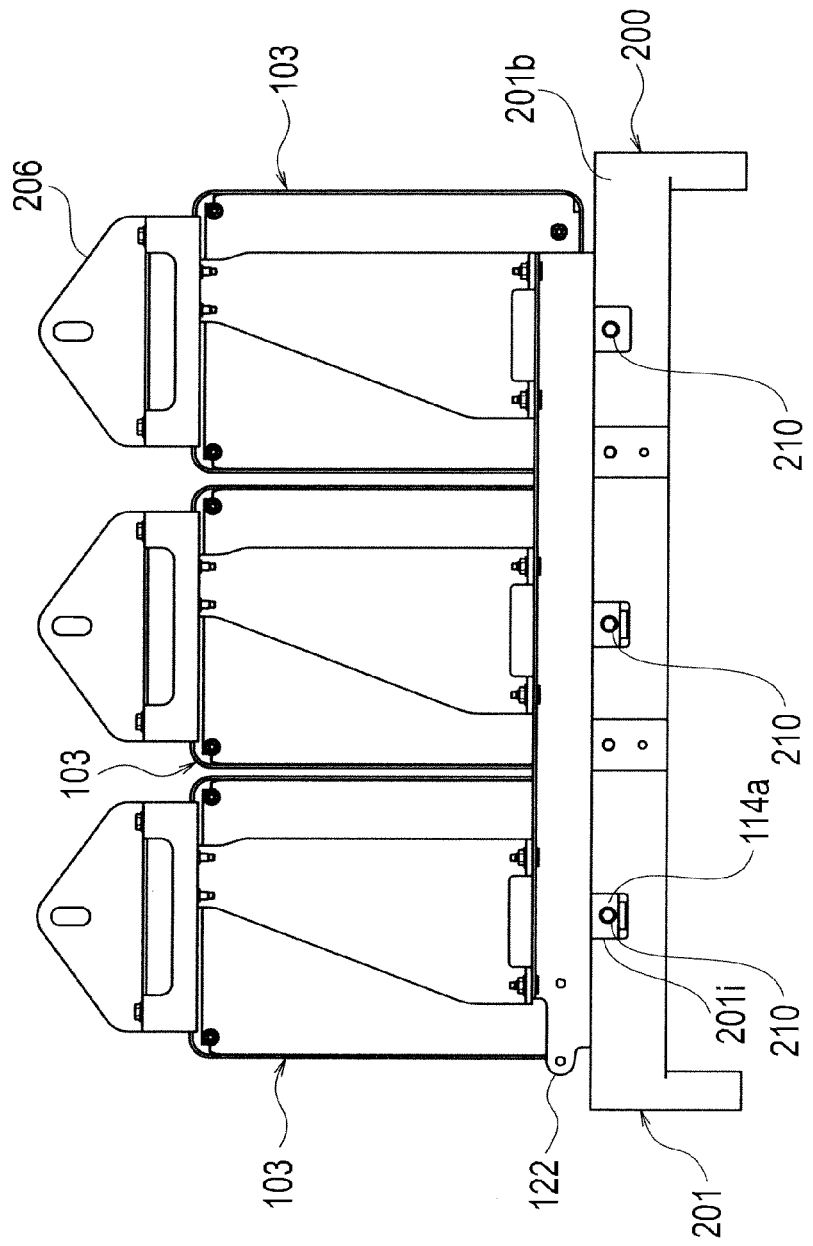
FIG. 21 is the other view showing a process of manufacturing the battery pack of the second embodiment of the present invention.

Next, a bolt 210 is screwed to each of the nuts 114c of the extending portions 43a of the second supporting member 113 of the battery modules 103, and thus the extending portions 43a are fixed to the first and second pillar members 121, 122 (see FIG. 21). At this time, the bolts 210 can by screwed to the nuts 114c by inserting the bolts 210 into the lateral groove portions 201f, 201i. Then, the slingers 206 are removed from the battery modules 103. Frame members other than the first and second pillar members 121, 122, as well as a control device and the like are attached to the battery modules 103. Thus, the assembly of the battery pack 102 is completed. The battery pack 102 can be detached from the pallet 201 by removing the bolts 204, 205.

Next, operations and effects of the second embodiment will be described below.

(1) The embodiment enables the adjustment of the interval between the first and second pillar members 121, 122 in the direction of the row of the batteries 104, and the adjustment of the relative positions of the respective first and second pillar members 121, 122 in the direction orthogonal to the direction of the row. This makes it possible to easily absorb a dimension error of each battery module 103 in the direction of the row of the batteries 104.

(2) Moreover, in the present embodiment, the turn prevention members are the bolts 204, 205; and the second pillar member 122 being one of the pillar members has the insertion holes 128f which allow the movement of the pillar member 122 in the direction of the row of the batteries 104, and in the direction orthogonal to the direction of the row, with the bolts 205 being inserted. Accordingly, the relatively simple configuration makes it possible to prevent the turn of the second pillar member 122 while allowing the movement of the second pillar member 122.

(3) Furthermore, in the embodiment, engaged portions are the engagement holes 118c; and engaging portions are the pin members 124, 129 including the tapered portions 124a, 129a which are formed in a way that makes the tapered portions 124a, 129a each become smaller in diameter toward the tip portion. This enables the engagement holes 118c and the pin members 124, 129 to be engaged together smoothly.

It should be noted that the entireties of Japanese Patent Application No. 2009-106895 (whose filing date is Apr. 24, 2009) and Japanese Patent Application No. 2009-106856 (whose filing date is Apr. 24, 2009) are incorporated herein.

Moreover, the present invention is not limited to the embodiments describe above, and can employ other various embodiments within the scope not departing from the gist of the present invention.

For example, in the second embodiment, the slide support portion is not limited to the upper surface 201r of the other supporting portion 201b, and may be the upper surface 201q of the one supporting portion 201a. In this case, the screw hole 201n is provided instead of the nut 125. In this case, the upper surface 201q slidably supports the first pillar member 121 in a way that enables the adjustment of the interval between the first and second pillar members 121, 122 in the lateral direction (the direction of the row of the batteries 104), and the adjustment of the relative positions of the respective first and second pillar members 121, 122 in the longitudinal direction (the direction orthogonal to the direction of the row of the batteries 104). Furthermore, the slide support portion may be formed of the upper surfaces 201q, 201r of the two respective supporting portions 201a, 201b. In other words, it suffices if the slide support portion supports at least one of the paired pillar members in a way that enables the adjustment of the interval between the paired pillar members in the direction of the row in the battery module, and the adjustment of the relative positions of the respective paired pillar member in the direction orthogonal to the direction of the row.

Note that the present invention includes the following characteristics.

(1) The method of positioning the battery modules 103, in which the battery modules 103 each including the multiple batteries 104 arranged in a row and the paired pillar members 121, 122 supporting the end portions of the battery modules 103 in the direction of the row are positioned relative to one another, the method including the steps of: assembling the paired pillar members 121, 122 to the jig apparatus 200 enabling the adjustment of the interval between the paired pillar members 121, 122 in the direction of the row and the adjustment of the relative positions of the respective paired pillar members 121, 122 in the direction orthogonal to the direction of the row; positioning the pillar members 121, 122 and the battery modules 103 relative to one another by: moving the paired pillar members 121, 122, which are assembled to the jig apparatus 200, and the battery modules 103 relative to one another; engaging the engaged portions of the battery modules 103 and the engaging portions of the paired pillar members 121, 122 together; and adjusting the interval between the pillar members 121, 122 and the relative positions of the respective pillar members 121, 122.

(2) The method of positioning the battery modules, wherein: the jig apparatus 200 is provided with the bolts 204, 205 serving as the members for preventing the turn of the pillar members; the pillar members have the insertion holes allowing the pillar members 121, 122 to move in the direction of the row and in the direction orthogonal to the direction of the row, with the bolts 204, 205 being inserted in the insertion holes; and the turn of the pillar members are prevented by the bolts 204, 205 and the insertion holes.

(3) The method of positioning the battery modules, wherein: the engaged portions are the engagement holes; and the engaging portions are the pin members 129 each having the tapered portion which is formed in a way that makes the tapered portion become smaller in diameter toward a tip portion.

(4) The jig apparatus 200 for the battery pack 102 which includes: the pallet 201 including the slide support portion; and the bolts 204, 205 serving as the turn prevention members, the jig apparatus 200 capable of positioning the battery modules 103 and the paired pillar members 121, 122 in the battery pack 102 in which both end portions of the battery modules 103 in the direction of the row are supported by the paired pillar members 121, 122, the jig apparatus 200 wherein at least one of the paired pillar members 121, 122 includes the insertion holes allowing the pillar members 121, 122 to move in the direction of the row and in the direction orthogonal to the direction of the row, with the turn prevention members inserted in the insertion holes, as well as is slidably supported by the slide supporting portion in a way that enables the adjustment of the interval between the paired pillar members 121, 122 in the direction of the row, and the adjustment of the relative positions of the respective paired pillar members 121, 122 in the direction orthogonal to the direction of the row; and the turn is prevented by the turning prevention members.

INDUSTRIAL APPLICABILITY

The present invention makes it possible to reduce the overall volume of the battery pack, because the accessories are attached to the side surfaces of the supporting members disposed on the sides where the extending portions of the stack members.

In other words, if the accessories would be disposed on a side surface on a side different from the sides where the extending portions of the stack members are disposed, the volume would be increased by the extending portions on the side where the extending portions are disposed, while the volume would be increased by the accessories on the side where the accessories are provided. For this reason, disposing the accessories on the side surfaces on the sides where the extending portions are disposed makes it possible to reduce the overall volume of the battery pack.

REFERENCE SIGNS LIST

1 BATTERY PACK
3 UPPER BATTERY MODULE (BATTERY MODULE)
5 CENTER BATTERY MODULE (BATTERY MODULE)
7 LOWER BATTERY MODULE (BATTERY MODULE)
9 BATTERY
12 ACCESSORIES
13 BATTERY CONTROLLER (ACCESSORY)
14 WIRE HARNESS (ACCESSORY)
16 ATTACHMENT PLATE (ACCESSORY)
35 SUPPORTING MEMBER
36 END PLATE (SUPPORTING MEMBER)
37 REINFORCEMENT MEMBER (SUPPORTING MEMBER)
43 STACK MEMBER
43a EXTENDING PORTION
51 SUPPORTING BRACKET

The invention claimed is:

1. A battery pack comprising:
paired supporting members disposed with a predetermined interval in between;
a battery module disposed between the supporting members; and
a stack member supporting the battery module by linking the supporting members to each other, wherein
an extending portion protruding from the battery module is formed by extending an end portion of the stack member in an extending direction of the stack member, and the supporting members are connected to the extending portion of the stack member,
the supporting member includes a side surface constituting a corresponding one of side surfaces of the battery pack, and a bent portion bent at and extending from an end portion of the side surface, and
accessories are attached to at least a side surface on a side where the bent portion of the supporting member is disposed, among side surfaces of the battery pack which are provided with the paired supporting members.

2. The battery pack according to claim 1, wherein
the supporting members include end plates and reinforcement members, respectively,
the end plates are provided to two ends of the battery module, and the reinforcement members are connected to the end plates, respectively, and
bent portion is provided to the reinforcement members.

3. The battery pack according to claim 1, further comprising a support bracket configured to connect the support member and the extending portion of the stack member.

4. The battery pack according to claim 1, wherein a length by which the extending portion of the stack member protrudes from the battery module is set larger than a length by which the accessories protrude from the battery module.

* * * * *

UNITED STATES PATENT AND TRADEMARK OFFICE
CERTIFICATE OF CORRECTION

| | | |
|---|---|---|
| PATENT NO. | : 9,130,210 B2 | Page 1 of 1 |
| APPLICATION NO. | : 14/077975 | |
| DATED | : September 8, 2015 | |
| INVENTOR(S) | : Hamada et al. | |

It is certified that error appears in the above-identified patent and that said Letters Patent is hereby corrected as shown below:

On the Title page of the patent, the Related U.S. Application Data should read as follows:

(62)  Division of application No. 13/265,453, filed as application No. PCT/JP2010/057216 on Apr. 23, 2010, now Pat. No. 8,592,068.

Signed and Sealed this
Tenth Day of May, 2016

Michelle K. Lee
*Director of the United States Patent and Trademark Office*